United States Patent
Lee et al.

(10) Patent No.: US 11,758,540 B2
(45) Date of Patent: Sep. 12, 2023

(54) MULTIPLEXING METHOD OF UPLINK CONTROL INFORMATION (UCI) FOR ULTRA-RELIABLE AND LOW LATENCY COMMUNICATIONS (URLLC)

(71) Applicant: ACER INCORPORATED, New Taipei (TW)

(72) Inventors: Chien-Min Lee, New Taipei (TW); Chia-Wen Hsieh, New Taipei (TW)

(73) Assignee: Acer Incorporated, New Taipei (TW)

( * ) Notice: Subject to any disclaimer, the term of this patent is extended or adjusted under 35 U.S.C. 154(b) by 114 days.

(21) Appl. No.: 16/823,347

(22) Filed: Mar. 19, 2020

(65) Prior Publication Data

US 2020/0305147 A1 Sep. 24, 2020

Related U.S. Application Data

(60) Provisional application No. 62/822,040, filed on Mar. 21, 2019.

(51) Int. Cl.
*H04W 72/21* (2023.01)
*H04L 1/1812* (2023.01)
*H04W 72/23* (2023.01)

(52) U.S. Cl.
CPC .......... *H04W 72/21* (2023.01); *H04L 1/1812* (2013.01); *H04W 72/23* (2023.01)

(58) Field of Classification Search
CPC combination set(s) only.
See application file for complete search history.

(56) References Cited

U.S. PATENT DOCUMENTS

| | | | | |
|---|---|---|---|---|
| 10,736,139 | B2 * | 8/2020 | You | H04W 72/0413 |
| 10,827,541 | B2 * | 11/2020 | Park | H04L 1/1854 |
| 10,873,966 | B2 * | 12/2020 | Papasakellariou | H04W 72/1289 |
| 11,140,666 | B2 * | 10/2021 | Guo | H04L 1/0073 |
| 2018/0167933 | A1 | 6/2018 | Yin | |
| 2018/0352575 | A1 | 12/2018 | You et al. | |

(Continued)

FOREIGN PATENT DOCUMENTS

| WO | 2017/142581 A1 | 8/2017 |
|---|---|---|
| WO | 2017142581 | 8/2017 |
| WO | 2018231728 | 12/2018 |

OTHER PUBLICATIONS

LG Electronics, "UCI enhancements for NR URLLC", 3GPP TSG RAN WG1 Meeting #95, Nov. 2018, pp. 1-4.

(Continued)

*Primary Examiner* — Hanh N Nguyen
(74) *Attorney, Agent, or Firm* — JCIPRNET

(57) ABSTRACT

A multiplexing method of uplink control information (UCI) for ultra-reliable and low latency communications (URLLC) includes acquiring a physical downlink shared channel (PDSCH) resource, processing the PDSCH resource to generate a physical uplink control channel (PUCCH) resource carrying the UCI, selecting an uplink resource from a physical uplink shared channel (PUSCH) resource, and multiplexing the PUCCH resource with the uplink resource selected from the PUSCH resource for transmitting the UCI of the PUCCH resource on the PUSCH resource. The PUCCH resource and the PUSCH resource are scheduled to be transmitted for providing at least two service types within a time period.

18 Claims, 24 Drawing Sheets

(56) References Cited

U.S. PATENT DOCUMENTS

2019/0246416 A1* 8/2019 Park .................. H04W 72/1278
2020/0296716 A1* 9/2020 Lin ....................... H04W 72/21
2020/0383132 A1* 12/2020 Yang ................. H04W 72/0453
2021/0168848 A1* 6/2021 Chatterjee ............. H04L 1/1854
2021/0337538 A1* 10/2021 Li ........................ H04L 1/1664

OTHER PUBLICATIONS

"Search Report of Europe Counterpart Application", dated Nov. 12, 2020, p. 1-p. 16.
LC Electronics, "UCI enhancements for NR URLLC," 3GPP TSG RAN WG1 Meeting #95, Nov. 2018, pp. 1-4.

* cited by examiner

MULTIPLEXING METHOD OF UPLINK CONTROL INFORMATION (UCI) FOR ULTRA-RELIABLE AND LOW LATENCY COMMUNICATIONS (URLLC)

CROSS REFERENCE TO RELATED APPLICATIONS

This application claims the benefit of U.S. provisional application No. 62/822,040 filed Mar. 21, 2019.

BACKGROUND OF THE INVENTION

1. Field of the Invention

The present invention illustrates a multiplexing method of uplink control information for ultra-reliable and low latency communications, and more particularly, a multiplexing method of the uplink control information for the ultra-reliable and low latency communications capable of providing at least two service types within a time period.

2. Description of the Prior Art

With the rapid advancements of technologies, several $5^{th}$ generation (5G) communications are developed and become trends of future telecom or mobile technologies. Ultra-reliable low-latency communications (URLLC) belong to one of several different types of use cases supported by a 5G new radio (NR) standard. Some physical layer enhancement methods are also introduced to the URLLC according to the 5G NR standard. Generally, the URLLC having the 5G NR standard can be applied to several entertainment communications and industry communications, such as augmented reality (AR) communications, virtual reality (VR) communications, factory automation communications, transport industry communications, and electrical power distribution communications. Targets of the physical layer enhancement methods for the URLLC having the 5G NR standard are to provide a high reliability (e.g., an error rate around $10^{-6}$) and a short latency (e.g., 0.5~1 milliseconds).

Further, enhanced mobile broadband (eMBB) communications also belongs to one of several different types of use cases supported by the 5G NR standard. Particularly, the eMBB communications focus on supporting an ever-increasing end user data rate and system capacity. Currently, in order to provide dual types of services for the URLLC and eMBB communications, the URLLC traffic is usually scheduled on a top of the ongoing eMBB transmissions. For example, a physical uplink shared channel (PUSCH) resource provides the eMBB service. A physical downlink shared channel (PDSCH) resource provides the URLLC service. After the PDSCH resource is processed, the uplink control information (UCI) such as hybrid automatic repeat (HARQ) information is generated. The UCI is scheduled to be transmitted on a physical uplink control channel (PUCCH) resource. Since the PUSCH resource and the PUCCH resource are fully or partially overlapped in the time domain, if no co-existence communications method is used, a traffic efficiency of the URLLC service and/or the eMBB service is decreased.

SUMMARY OF THE INVENTION

In an embodiment of the present invention, a multiplexing method of uplink control information for ultra-reliable and low latency communications is disclosed. The multiplexing method comprises acquiring a physical downlink shared channel (PDSCH) resource, processing the PDSCH resource to generate a physical uplink control channel (PUCCH) resource carrying the UCI, selecting an uplink resource from a physical uplink shared channel (PUSCH) resource, and multiplexing the UCI in the uplink resource selected from the PUSCH resource for transmitting the UCI in the PUSCH resource. The PUCCH resource and the PUSCH resource are scheduled for providing at least two service types within a time period.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
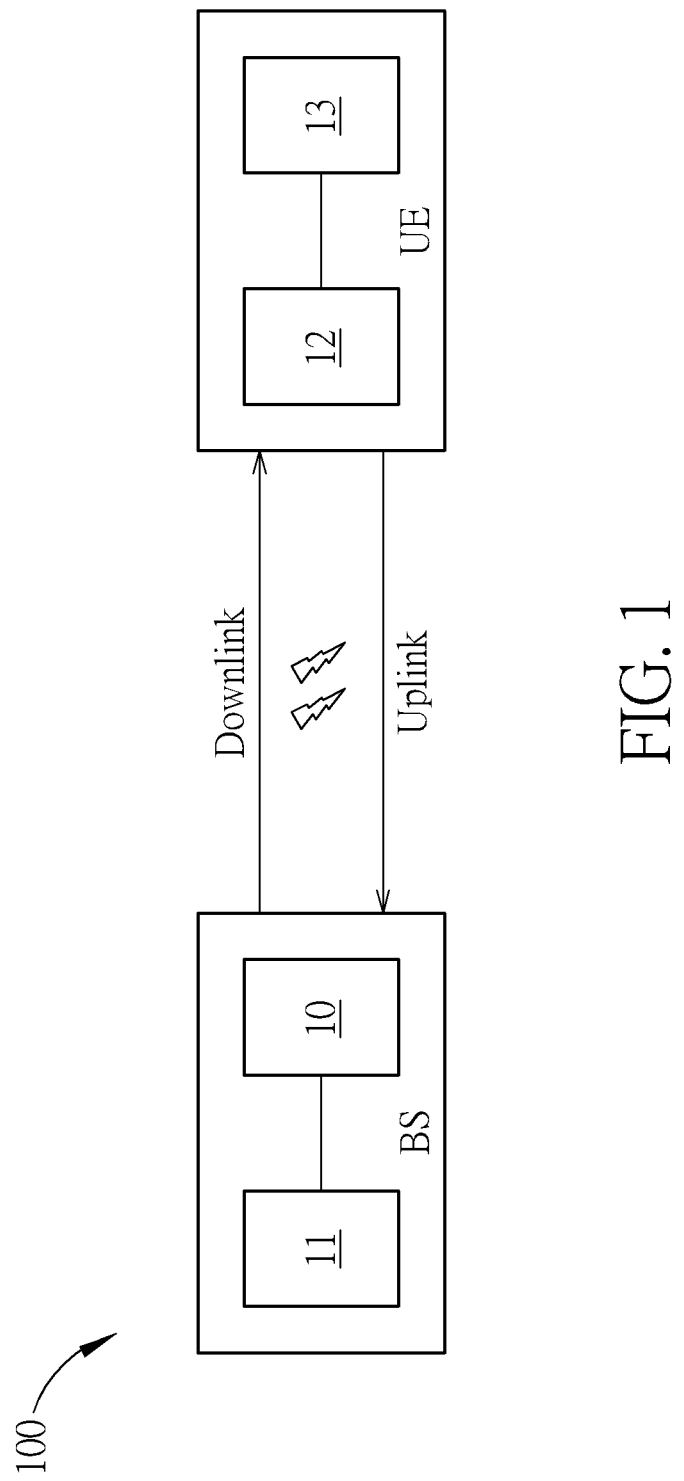
FIG. 1 is a block diagram of a system capable of multiplexing of uplink control information (UCI) for ultra-reliable and low latency communications (URLLC) according to an embodiment of the present invention.

FIG. 1 is a block diagram of a system 100 capable of multiplexing of uplink control information (UCI) for ultra-reliable and low latency communications (URLLC) according to an embodiment of the present invention. The system 100 can be applied to bidirectional communications under a $5^{th}$ generation (5G) standard. The system 100 includes a base station BS and an user equipment UE. The base station BS (i.e., say, "gNodeB or gNB") can provide a new radio (NR) user plane and control plane services. The user equipment UE can be any device directly used by an end-user for executing mobile communications. The user equipment UE can be a hand-held telephone, a smartphone, a laptop computer equipped with a mobile broadband adapter, or any communications device. The base station BS includes a transceiver 10 and a processor 11 coupled to the transceiver 10. The transceiver 10 can be a wireless transceiver for transmitting data from the base station BS to the user equipment UE through a downlink path and receiving data from the user equipment UE to the base station BS through an uplink path. The processor 11 can be used for allocating and scheduling data resources according to the $5^{th}$ generation standard. The user equipment UE includes a transceiver 12 and a processor 13. The transceiver 12 can be a wireless transceiver for transmitting data from the user equipment UE to the base station BS through the uplink path and receiving data from the base station BS to the user equipment UE through the downlink path. The processor 13 can process downlink data transmitted from the base station BS and generate uplink data to be transmitted to the base station BS according to scheduled time intervals. In the 5G NR communications, two service types can be provided by the system 100, such as a URLLC service and an enhanced mobile broadband (eMBB) communications service. Particularly, data of providing the URLLC service and the eMBB communications service can be carried by using different "data resources" scheduled in both time domain and frequency domain, as illustrated below.

Figure 2:
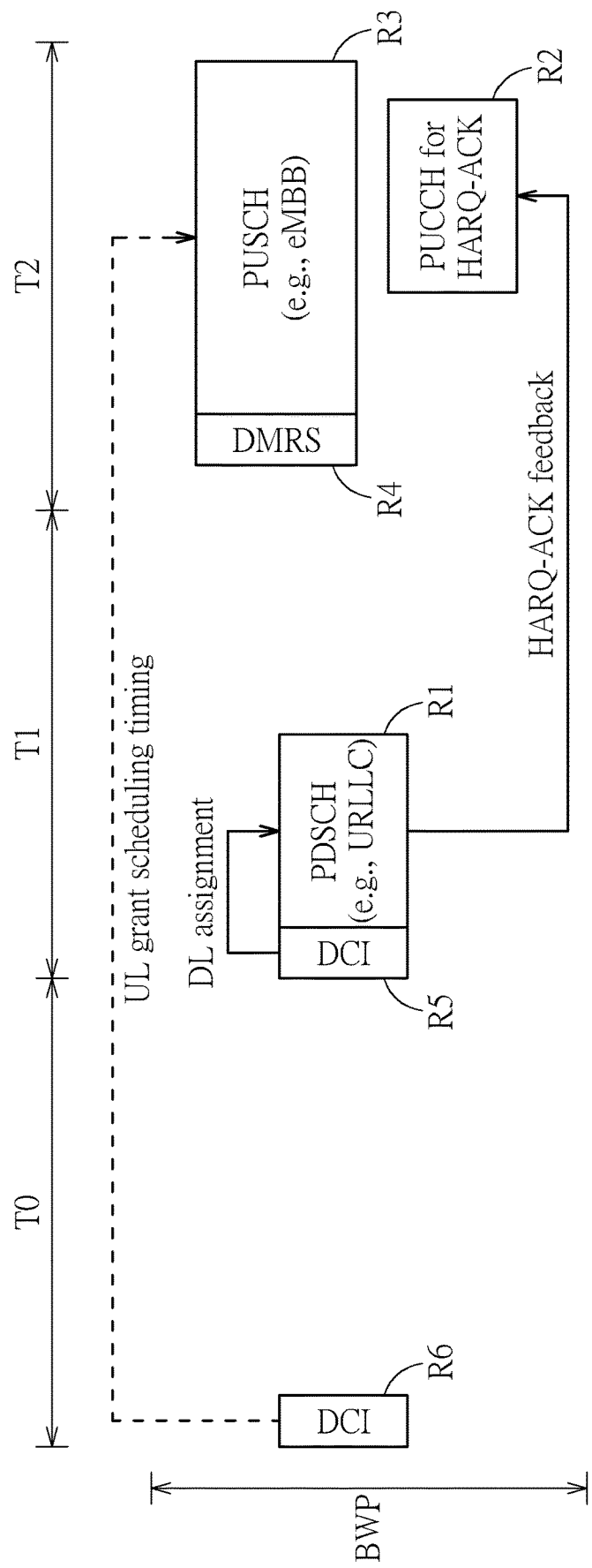
FIG. 2 is an illustration of scheduling data resources of the system in FIG. 1.

FIG. 2 is an illustration of scheduling data resources of the system 100. X-axis is a time domain. Y-axis is a frequency domain. Several data resources R1 to R6 can be scheduled according to time slots (such as time slots T0 to T2) and a system bandwidth BWP. In FIG. 2, the user equipment UE has a physical downlink shared channel (PDSCH) resource R1. The PDSCH resource R1 can correspond to a service type, such as the URLLC service (say, a second service type). For example, the PDSCH resource R1 can be a data resource for a hybrid automatic repeat request (HARQ) process. After the HARQ process is executed, the user equipment UE can generate HARQ response information (i.e., ACK signals or NACK signals) for the reception of PDSCH in PDSCH resource R1 to a physical uplink control channel (PUCCH) resource R2. The HARQ response information can be regarded as HARQ-ACK feedback. Therefore, the PUCCH resource R2 can be used for carrying the HARQ response information as uplink control information (UCI). However, the UCI is not limited to the HARQ response information. For example, the UCI can include the HARQ response information, channel state information (CSI), or scheduling request (SR) information. Any reasonable technology modification falls into the scope of the present invention. A physical uplink shared channel (PUSCH) resource R3 can correspond to a service type (say, a first service type), such as the eMBB communications service. The PUCCH source R2 and the PUSCH resource R3 may be fully or partially overlapped in the time domain. Further, the user equipment UE may have a demodulation reference signal (DMRS) resource R4 scheduled earlier than (or in an earlier part) the PUSCH resource R3. The DMRS resource R4 can be used for estimating uplink channel responses over frequency spectrum. The base station BS can have a downlink control information (DCI) resource R5. The DCI resource R5 can be used for indicating resource assignments (such as time and frequency resource(s), transport block size(s), modulation and coding scheme (MCS) level(s)) in the downlink path of the user equipment UE. Further, the base station BS can have a DCI resource R6 for granting several parameters such as scheduling time and frequency resource(s), transport block size(s), modulation and coding scheme (MCS) level, and beamforming information of the PUSCH resource R3. In FIG. 2, as previously mentioned, the PUCCH source R2 and the PUSCH resource R3 may be fully or partially overlapped in the time domain. In the system 100, the user equipment UE acquires the PUSCH resource R3, acquires the PDSCH resource R1, processes the PDSCH resource R1 to generate the UCI carried in PUCCH resource R2, selects an uplink resource from the PUSCH resource R3, and performs a multiplexing process for multiplexing the UCI of the PUCCH resource R2 in the uplink resource selected from the PUSCH resource R3 for transmitting the UCI in a part of resource of the PUSCH resource R3. Here, the PUCCH resource R2 and the PUSCH resource R3 are scheduled for providing different service types within a time period. In addition, the uplink resource selected from the PUSCH may be a set of time and frequency resource for the UCI multiplexing. In other words, when the system 100 is required for providing the different service types, if different resources corresponding to different service types are collided in the time domain, in order to avoid information loss or inhibiting one service communications by dropping one resource, various multiplexing methods are introduced to the system 100 for enhancing transmission capability, as illustrated below.

Figure 3:
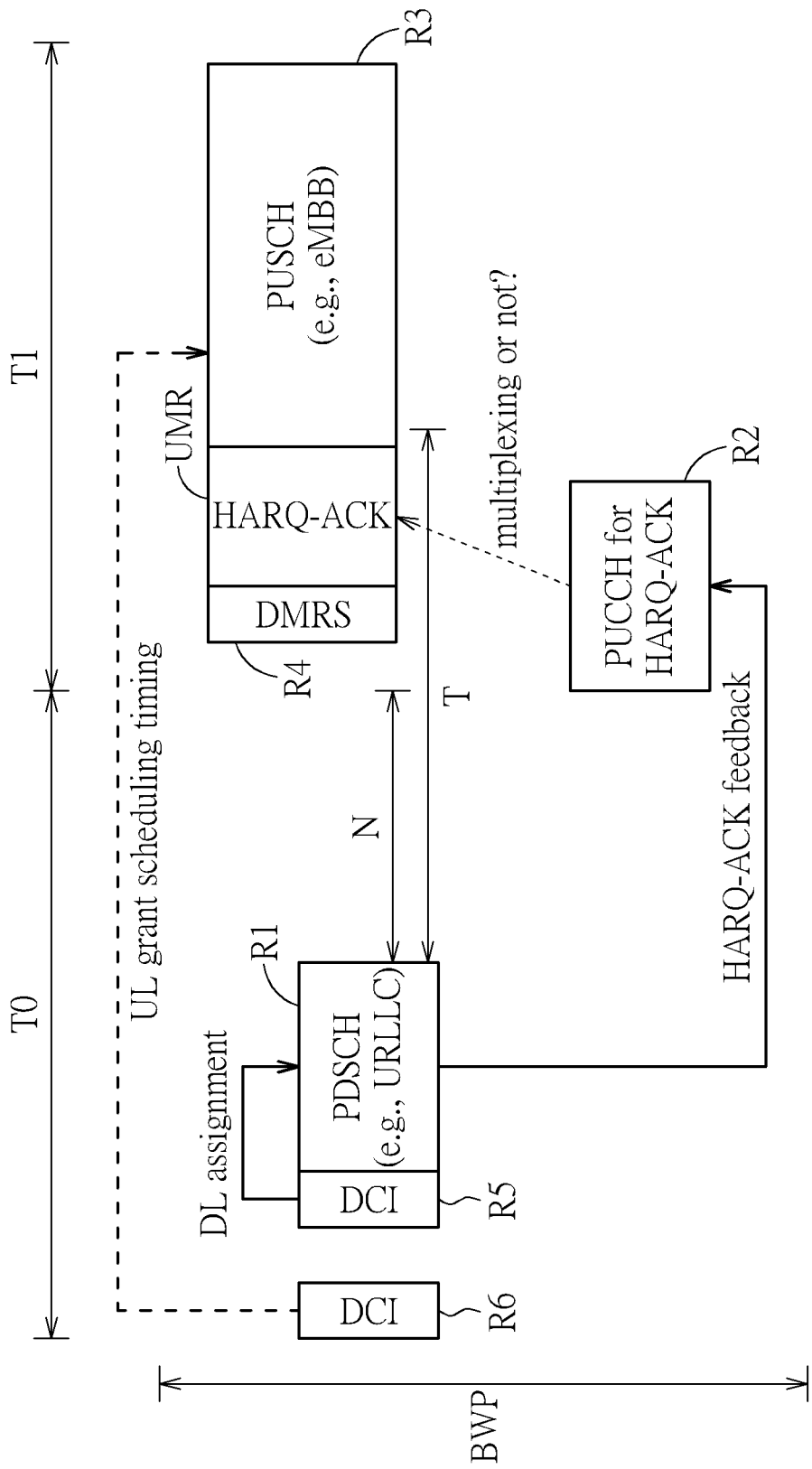
FIG. 3 is an illustration of determining if a hybrid automatic repeat (HARQ) response information carried by a physical uplink control channel (PUCCH) resource is multiplexed in an uplink resource selected from a physical uplink shared channel (PUSCH) resource of the system in FIG. 1.

FIG. 3 is an illustration of determining if the PUCCH resource R2 carrying the HARQ response information is multiplexed in the uplink resource UMR selected from the PUSCH resource R3 of the system 100. Here, when the user equipment UE is scheduled for transmitting the PUSCH resource R3 corresponding to a first service type (i.e., the eMBB communications service) and scheduled for transmitting the PUCCH resource R2 carrying the HARQ response information (i.e., its UCI) corresponding to a second service type (i.e., the URLLC service), the user equipment UE may determine if the HARQ response information carried by the PUCCH resource R2 could be multiplexed in the uplink resource UMR selected from the PUSCH resource R3. Here, if a multiplexing process is performed by the user equipment UE, the following conditions may be considered. In a first condition, a time distance between an end time of a last symbol of the PDSCH resource R1 and a start time of a first symbol of the uplink resource UMR for multiplexing (or allocating) the UCI in the PUSCH resource R3 is greater than or equal to a first processing time N (e.g., processing the PDSCH resource R1 for the URLLC service). In a second condition, a time distance between an end time of the last symbol of the PDSCH resource R1 and an end time of a last symbol of the uplink resource UMR for multiplexing (or allocating) the UCI in the PUSCH resource R3 is smaller than or equal to a latency requirement T (i.e., a latency for the second service type). In a third condition, the end time of the last symbol of the uplink resource UMR for multiplexing (or allocating) the UCI in the PUSCH resource R3 is earlier than or equal to an end time of a last symbol of the PUCCH resource R2. If the scheduled resources satisfy the first condition, the second condition, and/or the third condition, the user equipment UE may perform the multiplexing process for transmitting the HARQ response information for the second service type through a part of the PUSCH resource R3. In FIG. 3, the scheduled resources satisfy the first condition and the second condition. Here, if at least one condition is satisfied, the multiplexing process may be executed by the user equipment UE. Further, the PUCCH resource R2 can be dropped if the HARQ response information is multiplexed in the uplink resource UMR of the PUSCH resource R3. Therefore, transmitting two collided resources R2 and R3 from the user equipment UE to the base station BS can be avoided.

Figure 4:
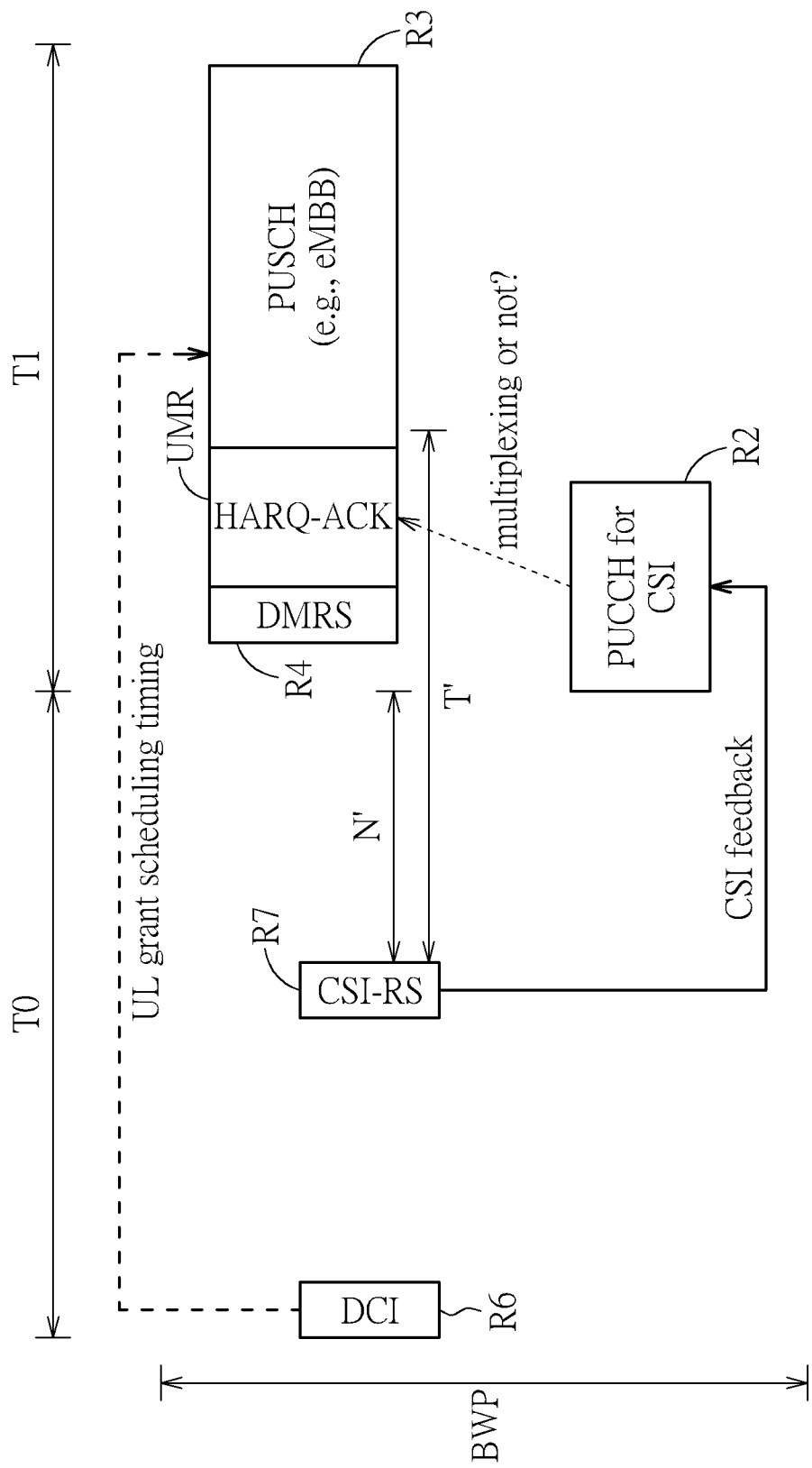
FIG. 4 is an illustration of determining if a channel state information (CSI) carried by the PUCCH resource is multiplexed with the uplink resource selected from the PUSCH resource.

FIG. 4 is an illustration of determining if the channel state information (CSI) carried by the PUCCH resource R2 is multiplexed in the uplink resource UMR selected from the PUSCH resource R3 of the system 100. Here, when the user equipment UE is scheduled to transmit a signal in the PUSCH resource R3 for providing a first service type (i.e., the eMBB communication service) and transmit a signal in the PUCCH resource R2 carrying CSI (UCI) for providing a second service type (i.e., the URLLC service), the user equipment UE can determine if the CSI carried by PUCCH resource R2 is multiplexed in the uplink resource UMR selected from the PUSCH resource R3. Here, the user equipment UE may acquire at least one DCI symbol, generate a CSI feedback signal (or information), and transmit the CSI feedback signal from a channel state information reference signal (CS-RS) resource R7 to the PUCCH resource R3. If the multiplexing process is performed by the user equipment UE, at least one of following condition have to be satisfied. In the first condition, a time distance between an end time of a last symbol of the CS-RS resource R7 and the start time of the first symbol of the uplink resource UMR for multiplexing the CSI in the PUSCH resource R3 is not smaller than a second processing time N' (e.g., processing the CSI-RS resource R7 to generate the CSI feedback signal). In the second condition, the time distance between the end time of the last symbol of the CSI-RS resource R7 and an end time of a last symbol of the uplink resource UMR for multiplexing the CSI in the PUSCH resource R3 is smaller than or equal to the latency requirement T' (i.e., a latency for determining the CSI). In a third condition, the end time of the last symbol of the uplink resource UMR for multiplexing the CSI in the PUSCH resource R3 is earlier than an end time of a last symbol of the PUCCH resource. In FIG. 4, the scheduled resources satisfy the first condition and the second condition. Here, if at least one condition is satisfied, the multiplexing process may be executed by the user equipment UE. Further, two additional conditions can also be considered for determining if the user equipment UE executes the multiplexing process. In a fourth condition, a time distance between an end time of a last symbol of a DCI (e.g., DCI R6) for triggering a CSI report and a start time of a first symbol of the uplink resource UMR multiplexed with the CSI in the PUSCH resource R3 is not smaller than the second processing time N'. In a fifth condition, a time distance between the end (or a first) time of the DCI symbols (e.g., DCI R6) for triggering the CSI report and the end time of the last symbol of the uplink resource UMR multiplexed with the CSI in the PUSCH resource R3 is smaller than or equal to the latency requirement T' (i.e., the latency for the DCI reception and CSI determination). In other words, the user equipment UE can dynamically execute the multiplexing process for transmitting the CSI through the part of the PUSCH resource R3 according to at least one of five conditions previously mentioned. Further, the PUCCH resource R2 can be dropped if the CSI is multiplexed in the uplink resource UMR of the PUSCH resource R3.

In FIG. 3 and FIG. 4, the UCI can include the HARQ response information or the CSI. However, the UCI can include scheduling request (SR) information. An end time of a last symbol of the uplink resource UMR multiplexed with the SR in the PUSCH resource R3 is earlier than or equal to an end time of a last symbol of the PUCCH resource R2 carrying the SR. Alternatively, when the uplink resource UMR selected from the PUSCH resource R3 is multiplexed with the SR information, at least one part of the PUCCH resource R2 can be dropped. Any reasonable multiplexing technology for providing two service types of the system 100 falls into the scope of the present invention.

In the system 100, the first processing time N and/or the second processing time N' can be determined according to a time length of processing the PDSCH resource R1 or CSI-RS resource R7, or according to configurations of the base station BS. The first processing time N and/or the second processing time N' can also be a constant. The latency requirements T and/or T' can be determined according to configurations of the base station BS. Further, the latency requirement T in FIG. 3 and the latency requirement T' in FIG. 4 may be different. The latency requirement T can be a constant or an adjustable value. The UCI can include the HARQ response information, the CSI, and/or the SR.

Figure 5:
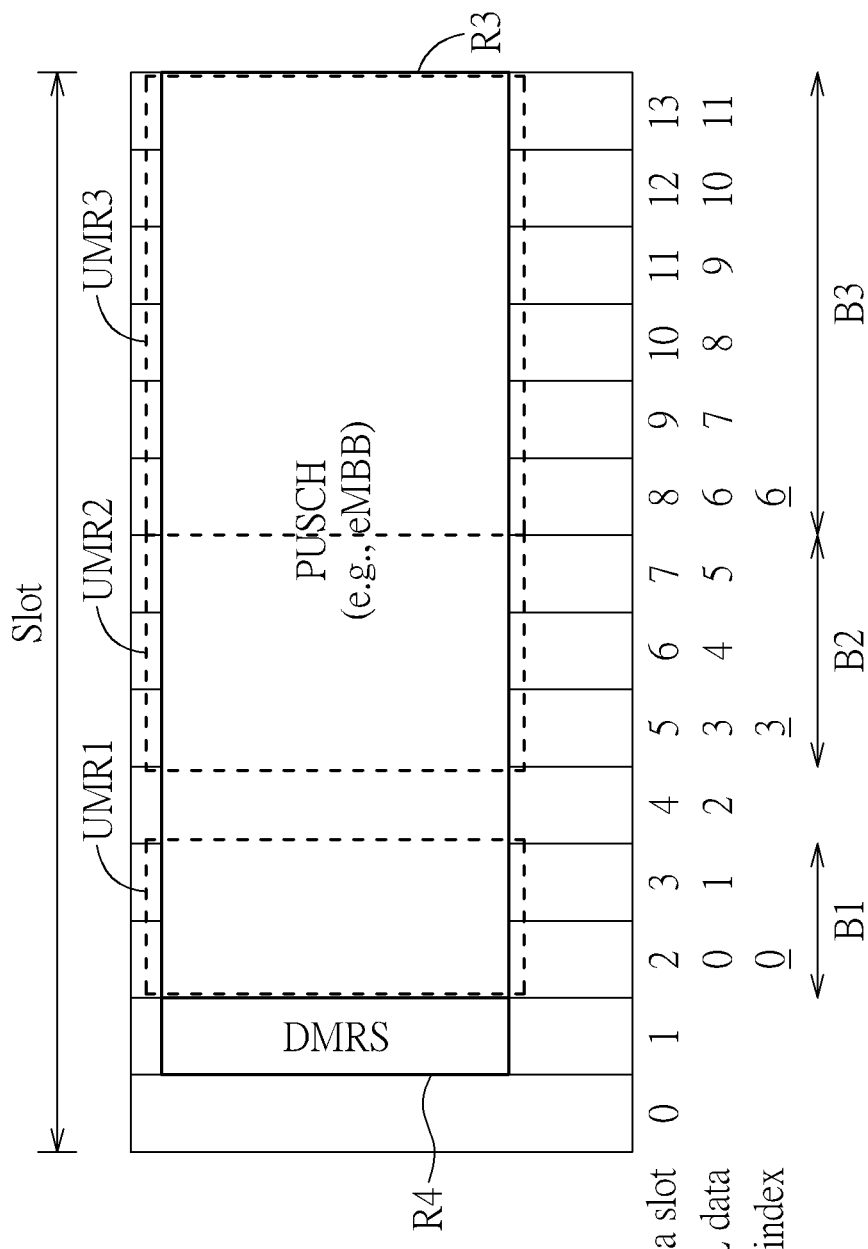
FIG. 5 is an illustration of various beta offsets corresponding to various candidate PUSCH symbol indices for UCI multiplexed with the PUSCH resource.

FIG. 5 is an illustration of various beta offsets corresponding to various candidate PUSCH symbol indices for uplink resources UMR1 to UMR3 multiplexed with UCI in the PUSCH resource R3 of the system 100. In order to multiplex the UCI in a part of PUSCH resource R3, a beginning symbol index and a requirement of the uplink resource (e.g., number of symbols or resource elements) for the multiplexing process have to be determined, as illustrated below. First, the user equipment UE can acquire a symbol index of the DMRS resource R4. For example, the symbol index of the DMRS resource R4 in a slot is "1". Then, the user equipment UE can acquire at least one candidate PUSCH symbol index according to subsequent symbols of the DMRS resource R4. For example, a candidate PUSCH symbol index "0" can correspond to a symbol index "2" in the slot. A candidate PUSCH symbol index "3" can correspond to a symbol index "5" in the slot. A candidate PUSCH symbol index "6" can correspond to a symbol index "8" in the slot. Then, the user equipment UE can acquire at least one requirement of the number of symbols of the uplink resource selected from the PUSCH resource R3 used for multiplexing the UCI according to the at least one candidate PUSCH symbol index. Here, the requirement of the number of symbols or resource elements may be determined according to a "beta offset". Different candidate PUSCH symbol indices may correspond to different beta offsets. For example, a beta offset for the candidate PUSCH symbol index "0" is equal to B1. A beta offset for the candidate PUSCH symbol index "3" is equal to B2. A beta offset for the candidate PUSCH symbol index "6" is equal to B3. Then, the user equipment UE can select a symbol index as a beginning symbol index of the uplink resource from the at least one candidate PUSCH symbol index for multiplexing the UCI. For example, the candidate PUSCH symbol index "0" can be selected for allocating the uplink resource UMR1 according to the beta offset B1 from the PUSCH resource R3. Similarly, the candidate PUSCH symbol index "3" can be selected for allocating the uplink resource UMR2 according to the beta offset B2 from the PUSCH resource R3. Similarly, the candidate PUSCH symbol index "6" can be selected for allocating the uplink resource UMR3 according to the beta offset B3 from the PUSCH resource R3. Here, B1, B2 and B3 are positive integers and B1<B2<B3. The beta offset can be regarded as the requirement of the number of symbols or resource elements of the uplink resource according to the beginning symbol index (i.e., a selected candidate PUSCH symbol index) of the uplink resource. Briefly, the user equipment can multiplex the UCI in the uplink resource (for example, the uplink resource UMR1) selected from the PUSCH resource R3 according to the beginning symbol index and the beta offset.

Further, the at least one candidate PUSCH symbol index can be determined according to the symbol index of the DMRS resource R4, a pre-defined or preconfigured symbol index in the slot, and/or a pre-defined or preconfigured symbol index of the PUSCH resource R3. Further, a PUSCH reliability is related to a symbol distance between a symbol index of the DMRS resource R4 and a beginning symbol index of the uplink resource UMR (as shown in FIG. 4) for multiplexing the UCI. For example, when the symbol distance between the beginning symbol index of the uplink resource UMR for multiplexing the UCI and the symbol index of the DMRS resource is increased, the reliability of PUSCH communications may be decreased. Therefore, a beta offset may be increased for enhancing the reliability of PUSCH communications. Conversely, when the symbol distance between the beginning symbol index of the uplink resource UMR for multiplexing the UCI and the symbol index of the DMRS resource R4 is decreased, the reliability of PUSCH communications may be increased. Therefore, a beta offset can be decreased for a proper amount of the uplink resource UMR.

Figure 6:
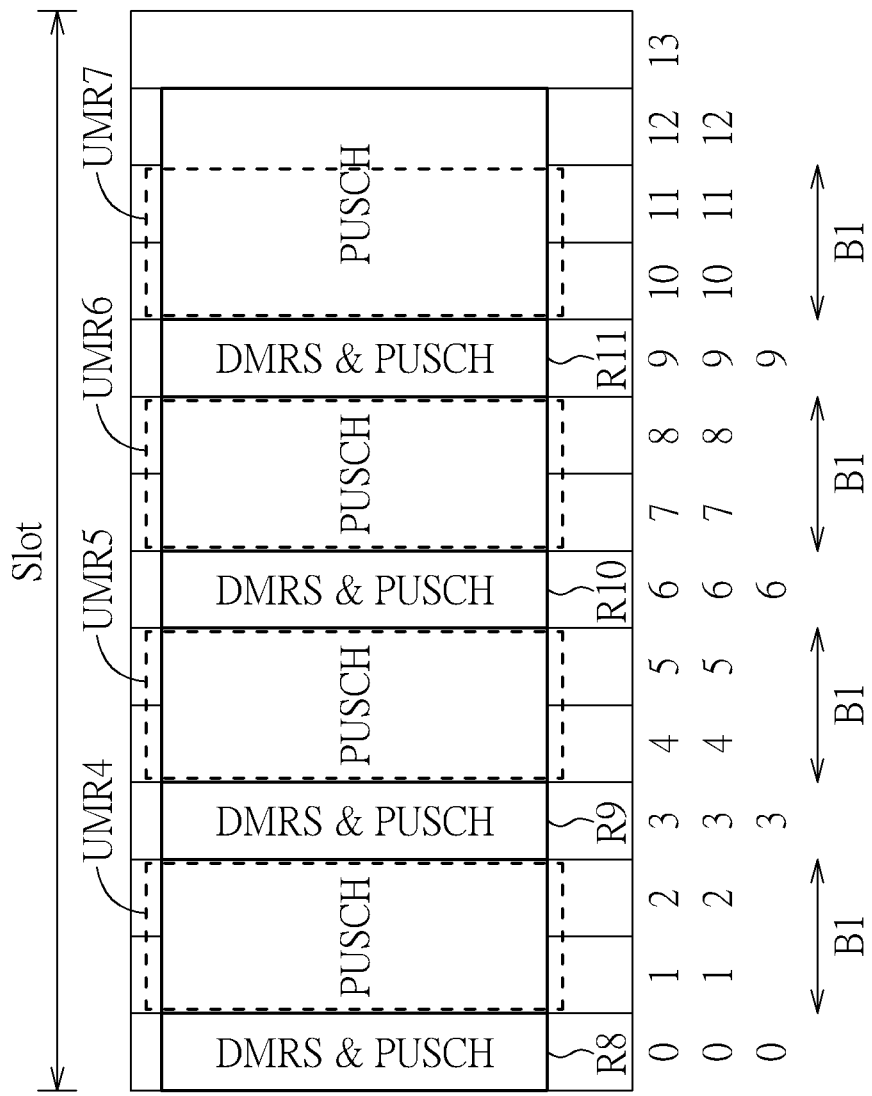
FIG. 6 is an illustration of selecting at least one uplink resource for multiplexing the UCI in the PUSCH resource according to a plurality of candidate PUSCH symbol indices.

FIG. 6 is an illustration of selecting at least one uplink resources UMR4 to UMR7 for multiplexing UCI in the PUSCH resource R3 according to a plurality of frequency-division multiplexing (FDM) resources R8 to R11 generated by multiplexing DMRS with PUSCH signals of the system 100. In FIG. 6, the FDM resources R8 to R11 are introduced in the slot. Each FDM resource can be used for multiplexing the DMRS with the PUSCH signal in the same symbol. Here, the uplink resources UMR4 to UMR7 may include FDM resource R8 to R11, respectively. Further, a part of each FDM resource R8 to R11 may be used for multiplexing the UCI. Another part of the each FDM resource R8 to R11 may be used for carrying DMRS. The DMRS and the UCI can be multiplexed in the FDM resource R8 to R11 by using a frequency-division multiplexing (FDM) process. The user equipment UE can acquire the plurality of FDM resources R8 to R11. The user equipment UE can set a plurality of symbol indices of the plurality of DMRS symbols as a plurality of candidate PUSCH symbol indices (i.e., hereafter say, DMRS symbols R8 to R11). For example, a symbol index of the DMRS symbol R8 in the slot is "0". A candidate PUSCH symbol index can be set as "0". A symbol index of the DMRS symbol R9 in the slot is "3". A candidate PUSCH symbol index can be set as "3". A symbol index of the DMRS symbol R10 in the slot is "6". A candidate PUSCH symbol index can be set as "6". A symbol index of the DMRS symbol R11 in the slot is "9". A candidate PUSCH symbol index can be set as "9". Then, the user equipment UE can determine beta offsets as requirements of the number of symbols or resource elements for allocating the uplink resource UMR4 to UMR7 according to the plurality of candidate PUSCH symbol indices. In FIG. 6, since the candidate PUSCH symbol indices can be selected equal to the symbol indices of the DMRS symbols R8 to R11, the beta offsets are identical (i.e., equal to B1) for all candidate PUSCH symbol indices {0, 3, 6, 9}. In other words, when the DMRS symbols R8 to R11 are uniformly distributed, the uplink resources UMR4 to UMR7 for multiplexing the UCI are also uniformly distributed and have identical symbol amounts.

Figure 7:
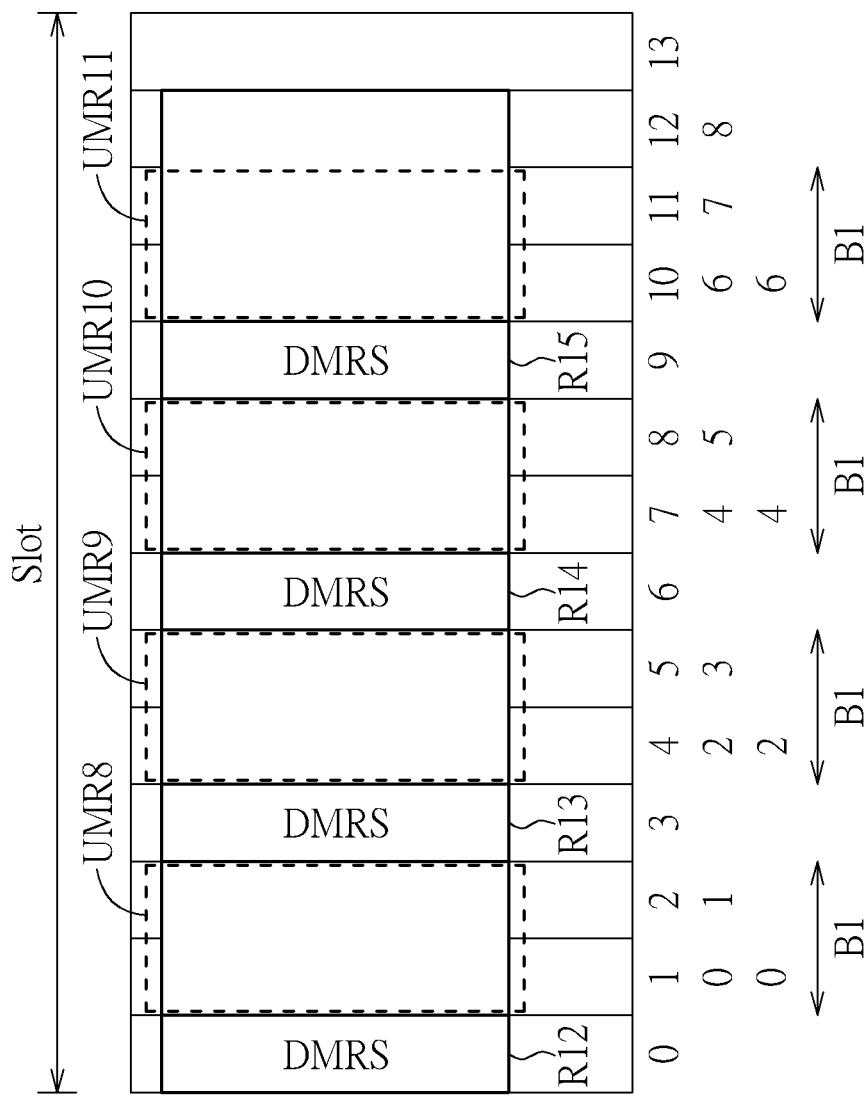
FIG. 7 is an illustration of selecting at least one uplink resource for multiplexing the UCI in the PUSCH resource according to a plurality of candidate PUSCH symbol indices.

FIG. 7 is an illustration of selecting at least one uplink resources UMR8 to UMR 11 multiplexed with the UCI in the PUSCH resource R3 according to a plurality of DMRS resources R12 to R15 of the system 100. The user equipment UE can acquire symbols of the plurality of DMRS resources R12 to R15 (i.e., hereafter, say "DMRS symbols R12 to R15"). Then, the user equipment UE can set a plurality of candidate PUSCH symbol indices according to the plurality of DMRS symbols R12 to R15. For example, a symbol index of the DMRS symbol R12 in the slot is "0". A candidate PUSCH symbol index can be set as "0" to indicate a symbol index "1" in the slot. A symbol index of the DMRS symbol R13 in the slot is "3". A candidate PUSCH symbol index can be set as "2" to indicate a symbol index "4" in the slot. A symbol index of the DMRS symbol R14 in the slot is "6". A candidate PUSCH symbol index can be set as "4" to indicate a symbol index "7" in the slot. A symbol index of the DMRS symbol R15 in the slot is "9". A candidate PUSCH symbol index can be set as "6" to indicate a symbol index "10" in the slot. Then, the user equipment UE can determine beta offsets as requirements of the number of symbols or resource elements for allocating the uplink resources UMR8 to UMR 11 according to the plurality of candidate PUSCH symbol indices. In FIG. 7, the beta offsets are identical (i.e., equal to B1) for all candidate PUSCH symbol indices {0, 2, 4, 6}. In other words, when the DMRS symbols R12 to R15 are uniformly distributed, the uplink resources UMR8 to UMR11 for multiplexing the UCI are also uniformly distributed and have identical symbol amounts. Further, transmission power of a DMRS symbol having a large symbol index (i.e., for example, the DMRS symbol R15) may greater than transmission power of a DMRS symbol having a small symbol index (i.e., for example, the DMRS symbol R12). It can also adopt in FIG. 5 and FIG. 8 to FIG. 9 as illustrated below.

Figure 8:
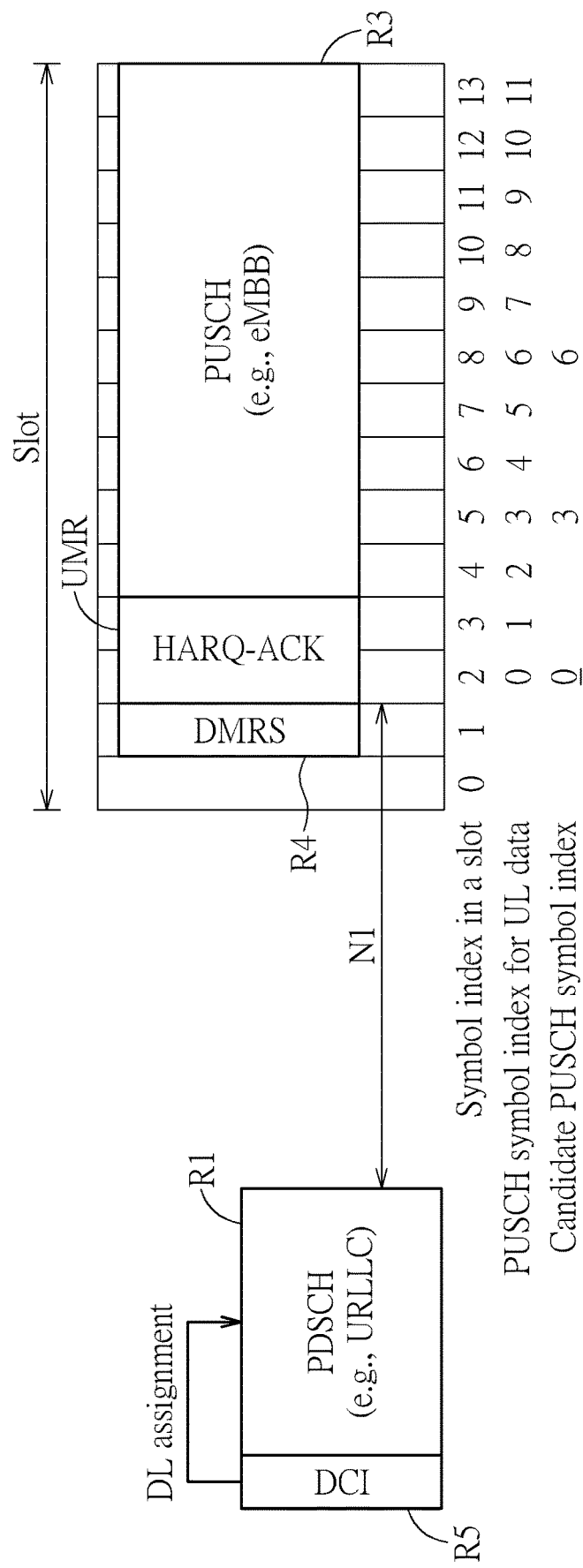
FIG. 8 is an illustration of a first mode for selecting a symbol index as a beginning symbol index of an uplink resource for multiplexing the UCI according to a first processing time of the PDSCH.
Figure 9:
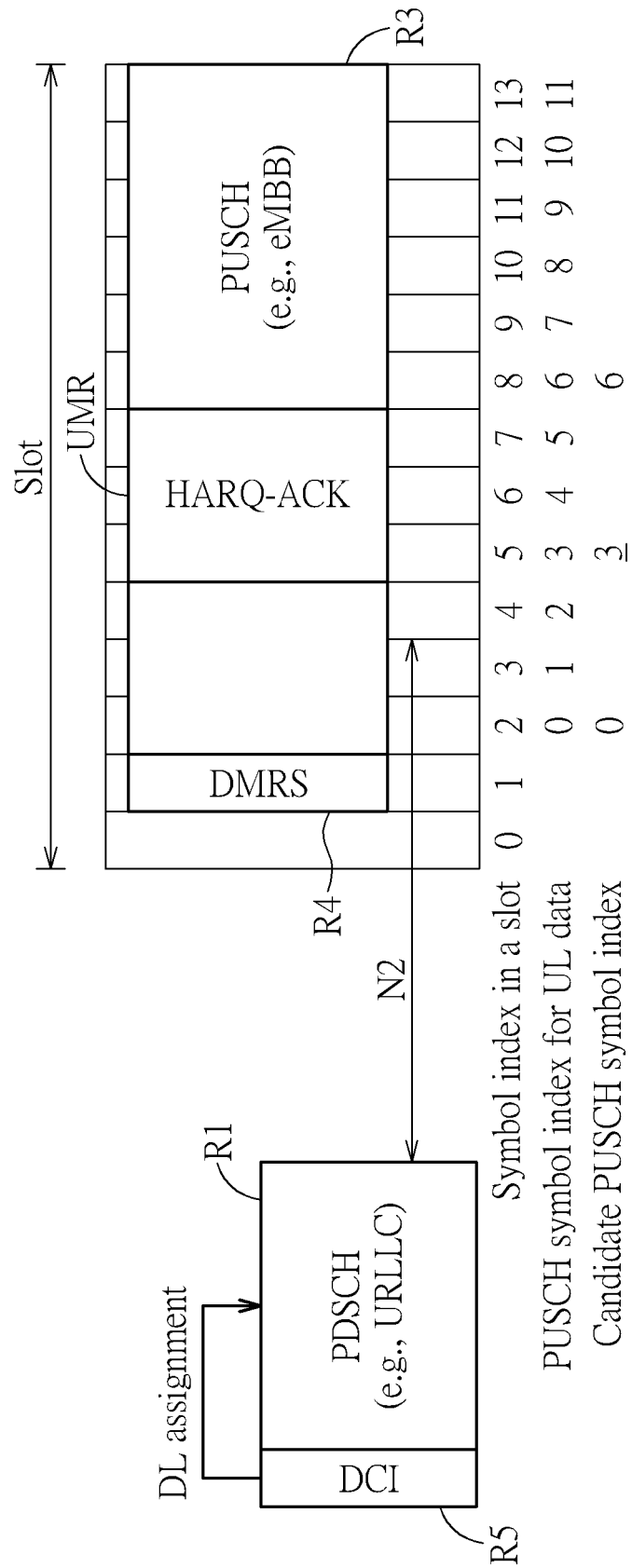
FIG. 9 is an illustration of a second mode for selecting a symbol index as a beginning symbol index of the uplink resource for multiplexing the UCI according to a first processing time of the PDSCH.
Figure 10:
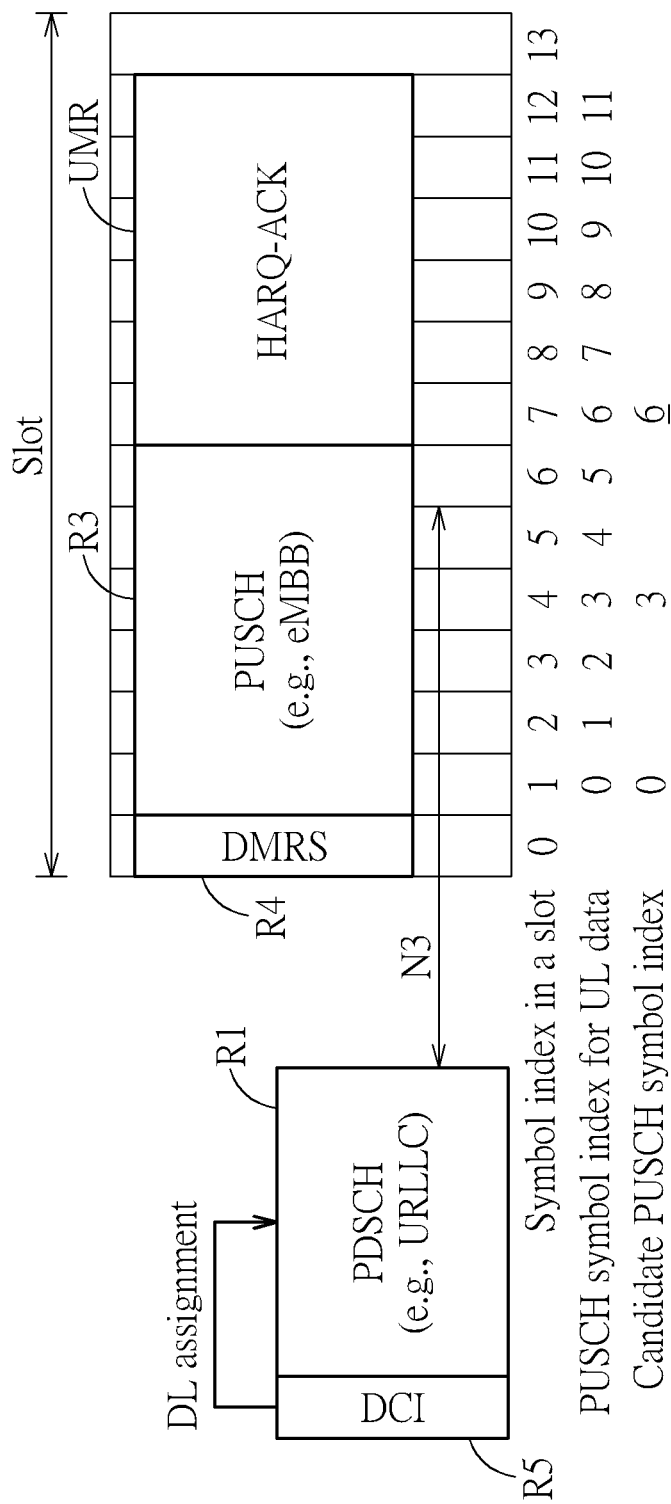
FIG. 10 is an illustration of a third mode for selecting a symbol index as a beginning symbol index of the uplink resource for multiplexing the UCI according to a first processing time of the PDSCH.

FIG. 8 is an illustration of a first mode for selecting a symbol index "0" as a beginning symbol index of the uplink resource UMR for multiplexing with the UCI according to a first processing time N1. FIG. 9 is an illustration of a second mode for selecting a symbol index "3" as a beginning symbol index of the uplink resource UMR for multiplexing with the UCI according to a first processing time N2. FIG. 10 is an illustration of a third mode for selecting a symbol index "6" as a beginning symbol index of the uplink resource UMR for multiplexing with the UCI according to a first processing time N3. In FIG. 8, the user equipment UE can acquire the first processing time N1 of processing the PDSCH resource for the second service type (e.g., URLLC) to generate the PUCCH resource carrying the HARQ response information. Then, the user equipment UE can acquire at least one candidate PUSCH symbol index (i.e., such as {0, 3, 6}). Then, the user equipment UE can select a symbol index "0" as a beginning symbol index of the uplink resource UMR from the at least one candidate PUSCH symbol index for multiplexing the UCI carried by PUCCH resource R2 with the uplink resource UMR. Specifically, a time distance between an end time of a last symbol of the PDSCH resource R1 and a start time of a first symbol of the uplink resource UMR multiplexed with the UCI in the PUSCH resource R3 may greater than or equal to the first processing time N1. Therefore, in FIG. 8, all candidate PUSCH symbol indices {0, 3, 6} can be selected as a first symbol index of the uplink resource UMR. However, for example, in order to improve the reliability of PUSCH communications and/or obtain a proper amount of the uplink resource UMR, the symbol index "0" can be selected from the candidate PUSCH symbol indices {0, 3, 6}. Similarly, in FIG. 9, since the time distance between the end time of the last symbol of the PDSCH resource R1 and the start time of the first symbol of the uplink resource UMR multiplexed with the UCI in the PUSCH resource R3 may greater than or equal to the first processing time N2, candidate PUSCH symbol indices {3, 6} can be selected as the first symbol index of the uplink resource UMR. However, for example, in order to improve the reliability of PUSCH communications and/or obtain a proper amount of the uplink resource UMR, the symbol index "3" can be selected from the candidate PUSCH symbol indices {3, 6}. Similarly, in FIG. 10, since the time distance between the end time of the last symbol of the PDSCH resource R1 and the start time of the first symbol of the uplink resource UMR multiplexed with the UCI in the PUSCH resource R3 may greater than or equal to the first processing time N3, a candidate PUSCH symbol index {6} can be selected as the first symbol index of the uplink resource UMR.

Further, The DMRS and the UCI can be multiplexed in the FDM resource by using a frequency-division multiplexing (FDM) process. In other words, a part of the FDM resource may be used for multiplexing the UCI. Another part of the FDM resource may be used for carrying DMRS. Any reasonable technology modification falls into the scope of the present invention.

Figure 11:
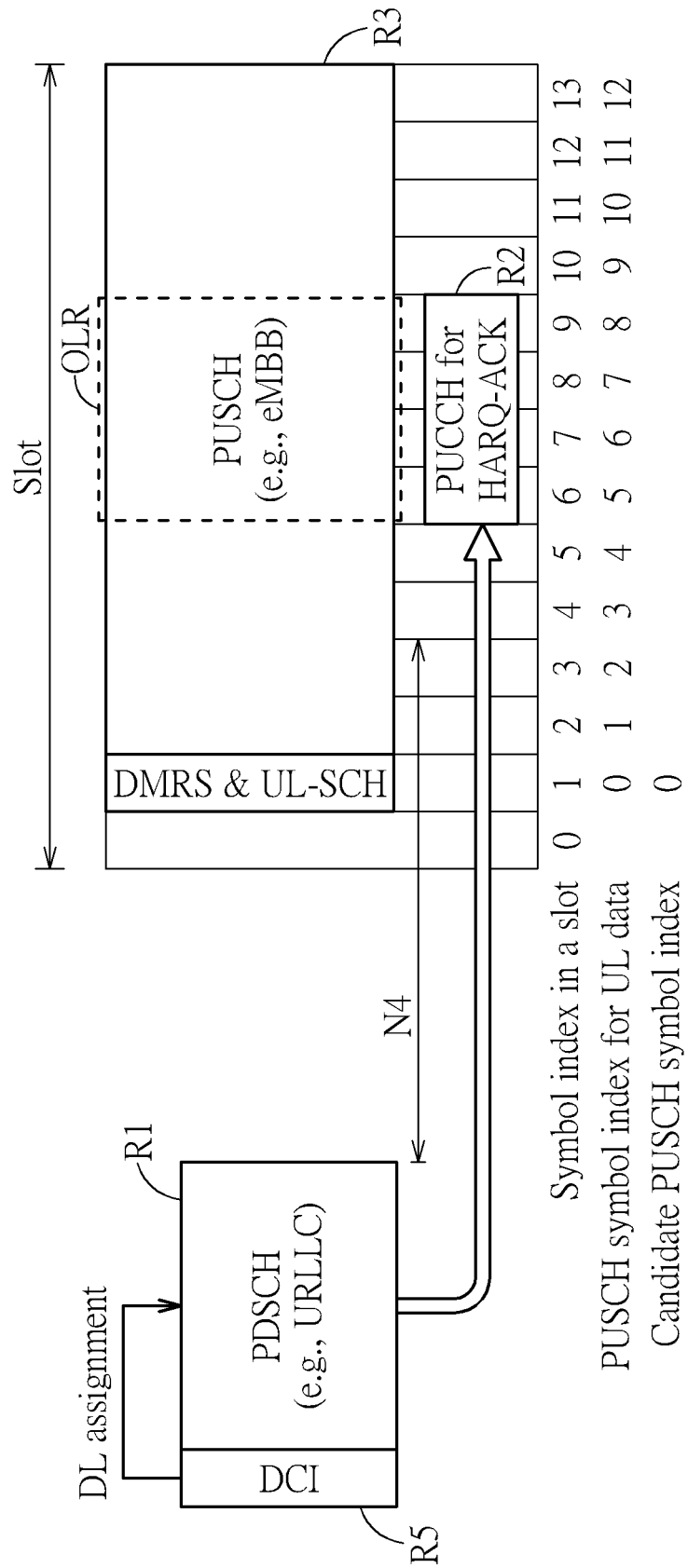
FIG. 11 is an illustration of dropping a part of the PUSCH resource when no candidate PUSCH symbol index satisfies a requirement of the first processing time of the PDSCH.

FIG. 11 is an illustration of dropping a part of the PUSCH resource R3 when no candidate PUSCH symbol index satisfies a requirement of a first processing time N4. In FIG. 11, the PUCCH resource R2 carrying the UCI (i.e., the HARQ response information) and the PUSCH resource R3 are overlapped in the time domain. An overlapped part of the PUSCH resource R3 is denoted as an overlapped resource OLR. Here, only one candidate PUSCH symbol index "0" is configured. Particularly, since the time distance between the end time of the last symbol of the PDSCH resource R1 and the start time of the first symbol of the uplink resource multiplexed with the UCI in the PUSCH resource R3 has to be greater than or equal to the first processing time N4, the candidate PUSCH symbol index "0" cannot be selected as the first symbol index of the uplink resource for multiplexing with the UCI. Therefore, no candidate PUSCH symbol can be selected in FIG. 11. The user equipment UE may transmit the UCI (i.e., the HARQ response information) carried by the PUCCH resource R2 and drop at least the overlapped resource OLR (i.e., four PUSCH symbols). After the transmission of the UCI carried by the PUCCH resource R2 is completed, residual symbols of the PUSCH resource R3 can be optionally transmitted or can be dropped.

Figure 12:
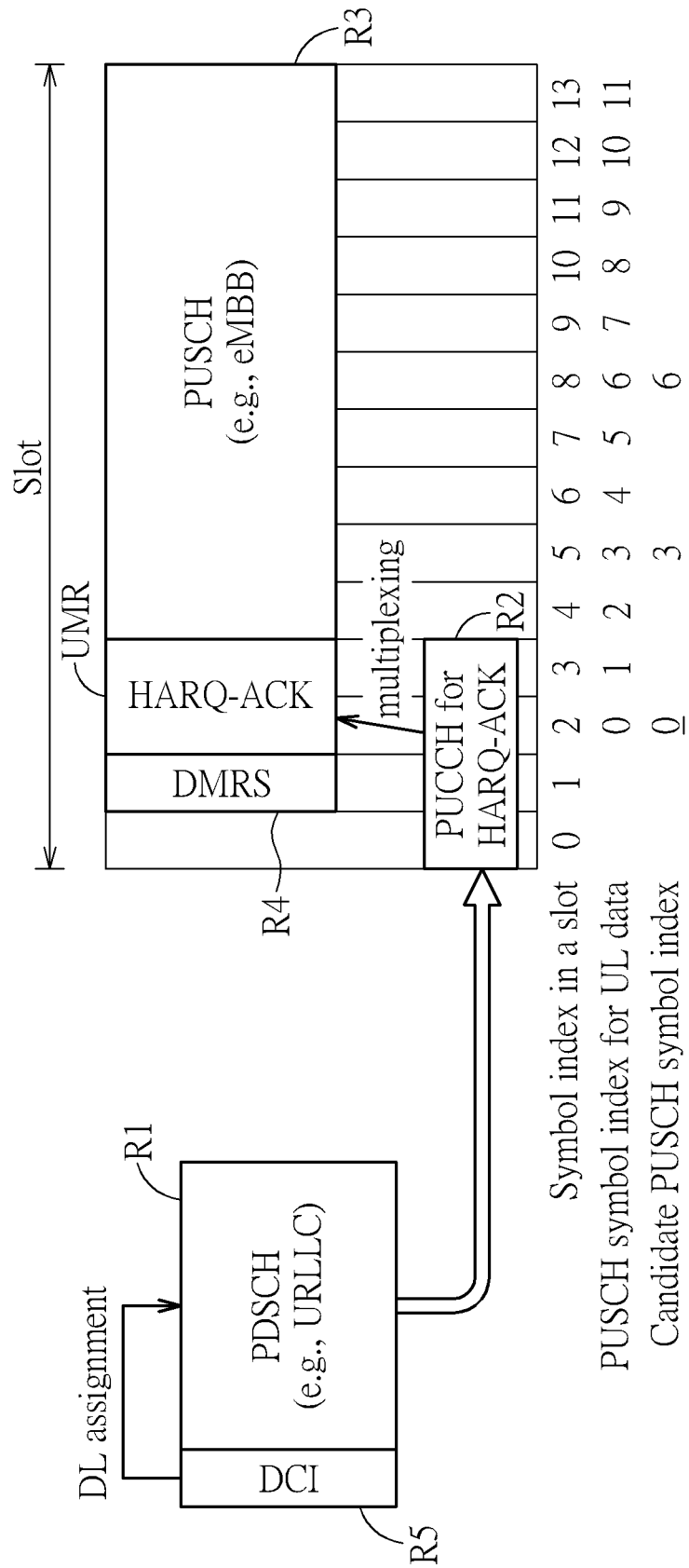
FIG. 12 is an illustration of a first method of selecting a candidate PUSCH symbol index according to the PUCCH resource carrying the UCI.

FIG. 12 is an illustration of a first method of selecting a candidate PUSCH symbol index "0" according to the PUCCH resource R2 carrying the UCI of the system 100. In FIG. 12, a position of the PUCCH resource R2 carrying the UCI can be regarded as a condition of selecting a first symbol of the uplink resource UMR for multiplexing the UCI carried by the PUSCH resource R3, as illustrated below. First, the user equipment UE can acquire a symbol of the DMRS resource R4 (say, the DMRS symbol R4). Then, the user equipment UE may set at least one candidate PUSCH symbol index according to the DMRS symbol R4. As shown in FIG. 12, the candidate PUSCH symbol indices can be set as {0, 3, 6}. Particularly, a start time of a first symbol of the uplink resource UMR multiplexed with the UCI may later than or equal to a start time of a first symbol of the PUCCH resource R2. Therefore, one candidate PUSCH symbol index can be selected from a set {0, 3, 6} as the first symbol of the uplink resource UMR. For example, the user equipment UE can select the candidate PUSCH symbol index "0" from the set {0, 3, 6} as the first symbol index of the uplink resource UMR for multiplexing with the UCI (i.e., the HARQ response information) carried by the PUCCH resource R2. Further, when the candidate PUSCH symbol index "0" is selected as the first symbol index of the uplink resource UMR, since the symbol distance between the first symbol index of the uplink resource UMR and the symbol index of the DMRS resource R4 is minimized, the reliability of PUSCH communications could be kept. In other words, when at least two candidate PUSCH symbol indices (i.e., {0, 3, 6}) satisfy the condition of the position of the PUCCH resource R2, one candidate PUSCH symbol index "0" can be selected as the first symbol index of the uplink resource UMR for minimizing a time distance between an end time of the DMRS symbol R4 and the start time of the first symbol of the uplink resource UMR multiplexed with the UCI.

Figure 13:
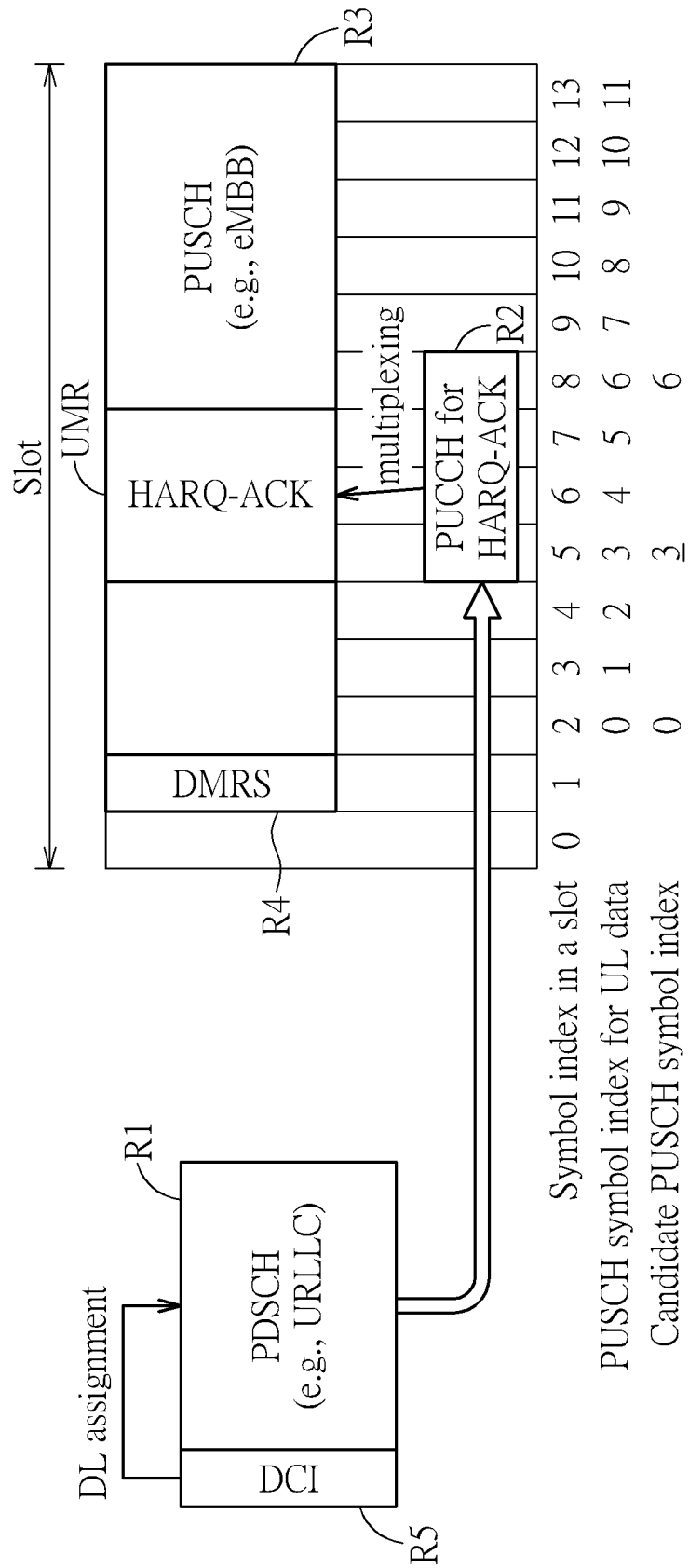
FIG. 13 is an illustration of a second method of selecting a candidate PUSCH symbol index according to the PUCCH resource carrying the UCI.

FIG. 13 is an illustration of a second method of selecting a candidate PUSCH symbol index "3" according to the PUCCH resource R2 carrying the UCI of the system 100. Similarly, the user equipment UE can acquire the symbol of the DMRS resource R4 (say, the DMRS symbol R4). Then, the user equipment UE may set at least one candidate PUSCH symbol index according to the DMRS symbol R4. As shown in FIG. 13, the candidate PUSCH symbol indices can be set as {0, 3, 6}. Particularly, the start time of the first symbol of the uplink resource UMR selected for multiplexing the UCI is later than or equal to a start time of the first symbol of the PUCCH resource R2. Further, in other embodiments, a time distance between a start time of a first symbol of the uplink resource UMR multiplexed with the UCI on the PUSCH resource R3 and the start time of the first symbol of the PUCCH R2 is minimized, wherein the first symbol is selected from the candidate PUSCH symbol indices. For example, a candidate PUSCH symbol index "3 can be selected from the set {0, 3, 6} for minimizing the time distance between the start time of the first symbol of the uplink resource UMR multiplexed with the UCI on the PUSCH resource R3 and the start time of the first symbol of the PUCCH R2. In previous case, one candidate PUSCH symbol index can be selected from a set {3, 6} as the first symbol of the uplink resource UMR. For example, the user equipment UE can select the candidate PUSCH symbol index "3" from the set {3, 6} as the first symbol index of the uplink resource UMR for multiplexing the UCI (i.e., the HARQ response information). Further, when the candidate PUSCH symbol index "3" is selected as the first symbol index of the uplink resource UMR, since the symbol distance between the first symbol index of the uplink resource UMR and the symbol index of the DMRS resource R4 is minimized, the reliability of PUSCH communications can be kept. Similarly, in other words, when at least two candidate PUSCH symbol indices (i.e., {3, 6}) satisfy the condition of the position of the PUCCH resource R2, one candidate PUSCH symbol index "3" can be selected as the first symbol index of the uplink resource UMR for minimizing a time distance between an end time of the DMRS symbol R4 and the start time of the first symbol of the uplink resource UMR multiplexed with the PUCCH resource R2. On the other hand, the latency of UCI transmission can be minimized after comparing with the candidate symbol index "6".

Figure 14:
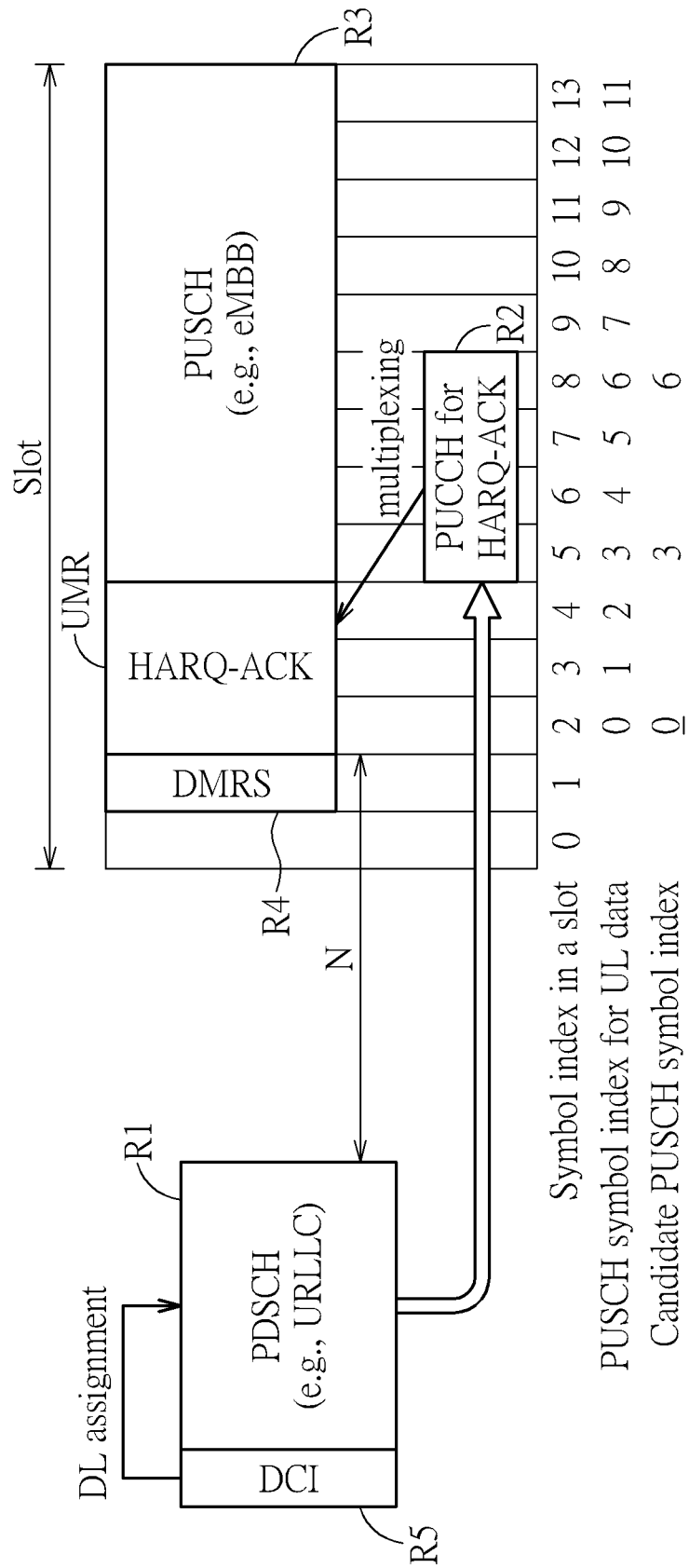
FIG. 14 is an illustration of selecting a candidate PUSCH symbol index according to a processing time.

FIG. 14 is an illustration of selecting a candidate PUSCH symbol index "0" according to the first processing time N of the system 100. As previously mentioned, the position of the PUCCH resource R2 carrying the UCI can be regarded as the condition of selecting a first symbol of the uplink resource UMR for multiplexing the UCI carried by the PUCCH resource R2. However, the present invention is not limited to selecting the first symbol of the uplink resource UMR according to the position of the PUCCH resource R2. For example, the first symbol of the uplink resource UMR can be selected according to the first processing time N, as illustrated below. First, the user equipment UE can acquire a symbol of the DMRS resource R4 (say, the DMRS symbol R4). Then, the user equipment UE can set at least one candidate PUSCH symbol index according to the DMRS symbol R4. As shown in FIG. 14, the candidate PUSCH symbol indices can be set as {0, 3, 6}. Here, a time distance between an end time of a last symbol of the PDSCH resource R1 and a start time of a first symbol of the uplink resource UMR multiplexed with the UCI in the PUSCH resource R3 is greater than or equal to the first processing time N of processing the PDSCH resource to generate the PUCCH resource carrying the UCI (i.e., the HARQ response information). Therefore, one candidate PUSCH symbol index can be selected from a set {0, 3, 6} as the first symbol index of the uplink resource UMR. Specifically, although the start time of the first symbol of the uplink resource UMR multiplexed with the UCI is "earlier" than a start time of the first symbol of the PUCCH resource R2 (i.e., for candidate PUSCH symbol index "0"), if the candidate PUSCH symbol index satisfies the condition of the first processing time N, the candidate PUSCH symbol index can be selected. For example, the user equipment UE can select the candidate PUSCH symbol index "0" from the set {0, 3, 6} as the first symbol index of the uplink resource multiplexed with the UCI. When the candidate PUSCH symbol index "0" is selected as the first symbol index of the uplink resource UMR, since the symbol distance between the first symbol index of the uplink resource UMR and the symbol index of the DMRS resource R4 is minimized, the reliability of PUSCH communications can be kept. In other words, when at least two candidate PUSCH symbol indices (i.e., {0, 3, 6}) satisfy a condition of the first processing time N, one candidate PUSCH symbol index "0" can be selected as the first symbol index of the uplink resource UMR for minimizing a time distance between an end time of the DMRS symbol R4 and the start time of the first symbol of the uplink resource UMR multiplexed with the UCI.

Further, the first symbol index of the uplink resource UMR for multiplexing with the UCI can be determined according to a time offset L. L can be a constant or a pre-defined value configured by the base station BS. A candidate PUSCH symbol index is selected according to the following condition related to the time offset. For example, the candidate PUSCH symbol index can be selected for minimizing a time distance between a start time of a first symbol of the PUCCH resource R2 and a start time of a first symbol of the uplink resource UMR for multiplexing with the PUCCH resource R2 carrying the UCI. In other embodiments, the first symbol of the uplink resource UMR for multiplexing the UCI can be directly assigned according to the scheduling DCI by the base station BS for the second service type.

Figure 15:
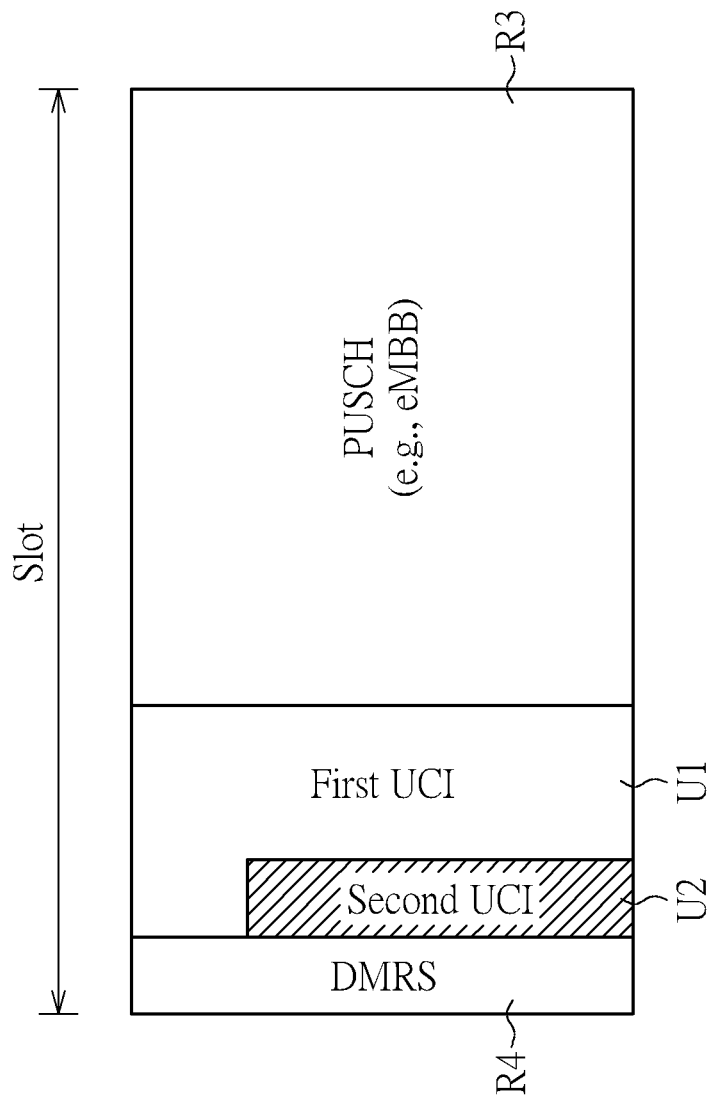
FIG. 15 is an illustration of overwriting first UCI by second UCI when two UCI services are collided on the PUSCH.
Figure 16:
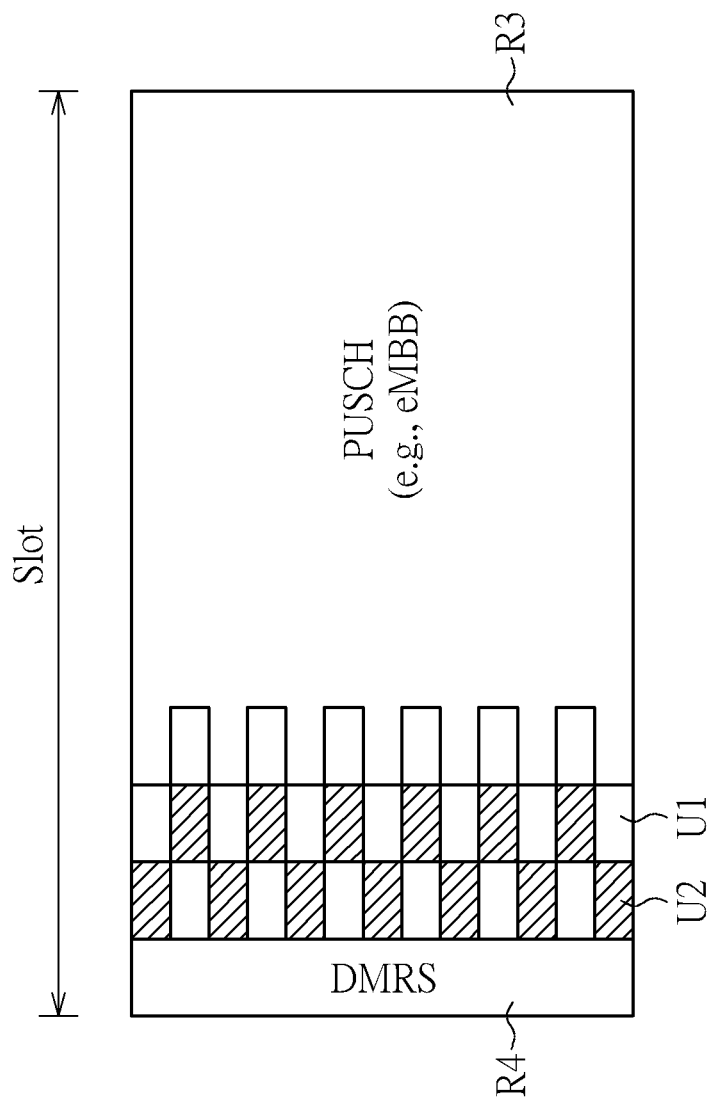
FIG. 16 is an illustration of multiplexing the first UCI and the second UCI by using a frequency-division multiplexing (FDM) process when two UCI services are collided on the PUSCH.

FIG. 15 is an illustration of overwriting first UCI U1 by second UCI U2 when two UCI services are collided on the PUSCH R3. FIG. 16 is an illustration of multiplexing the first UCI U1 and the second UCI U2 by using a frequency-division multiplexing (FDM) process when two UCI services are collided on the PUSCH R3. As shown in FIG. 15 and FIG. 16, when the first UCI U1 for $1^{st}$ type service (e.g., eMBB) is collided with the second UCI U2 service for $2^{nd}$ service (e.g., URLLC) on the PUSCH R3, two options can be introduced for processing two UCI services by the user equipment UE. In a first option, as shown in FIG. 15, the user equipment UE may overwrite (or say, puncture) the first UCI U1 by the second UCI U2. Therefore, two services can be provided by the user equipment UE. In a second option, the user equipment UE may multiplex the first UCI U1 and the second UCI on the PUSCH R3. As shown in FIG. 16, allocations of pieces of the first UCI U1 and the second UCI can be interleaved by using the FDM process. Therefore, two services can also be provided by the user equipment UE.

Figure 17:
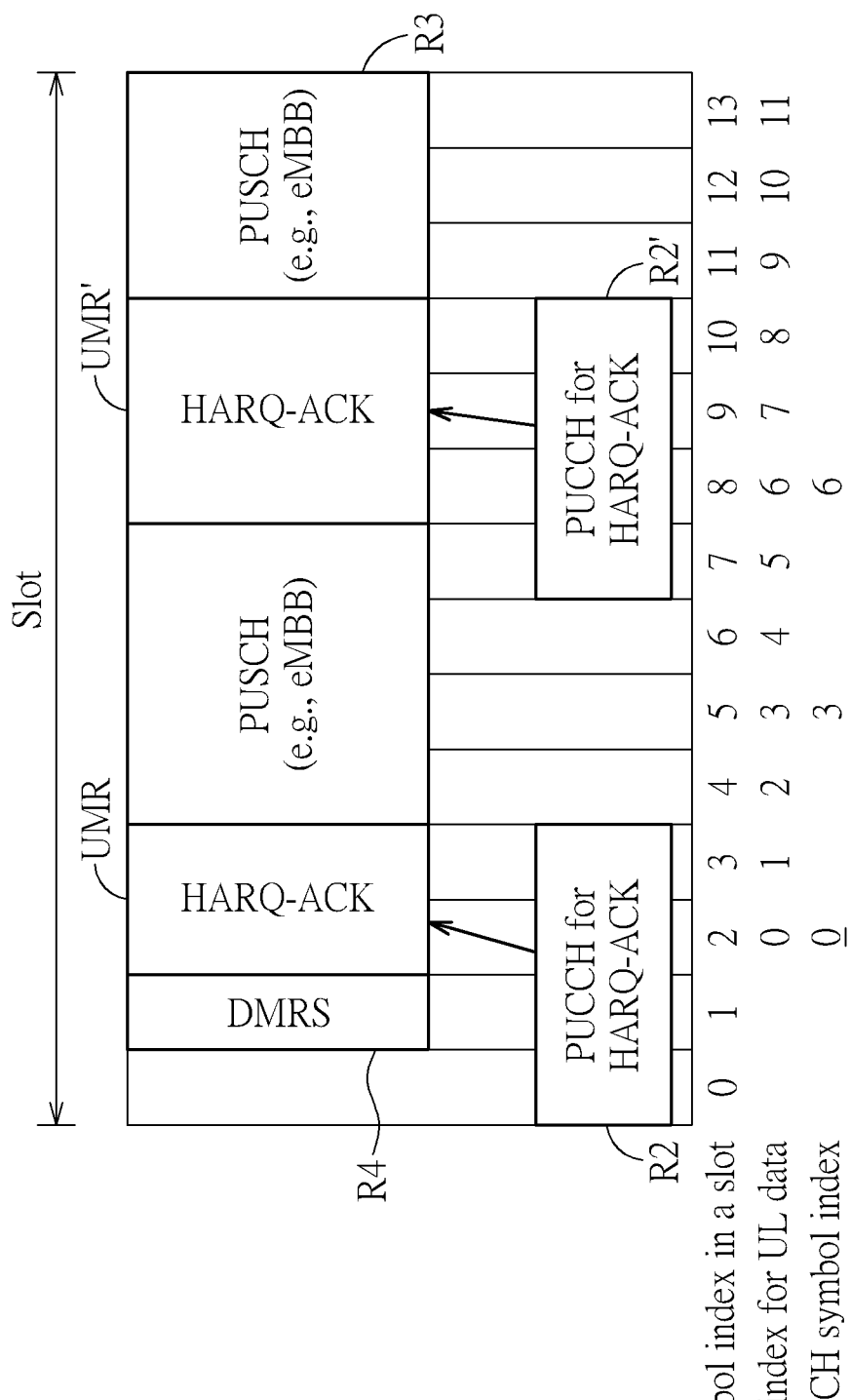
FIG. 17 is an illustration of multiplexing at least two PUCCH resources with the UCI carried by at least two uplink resources.

FIG. 17 is an illustration of multiplexing at least two PUCCH resources R2 and R2' with the UCI carried by at least two uplink resources UMR and UMR'. Here, the user equipment UE can acquire the symbol of the DMRS resource R4 (say, the DMRS symbol R4). Then, the user equipment UE can set a plurality of candidate PUSCH symbol indices {0, 3, 6} according to the DMRS symbol R4. Then, the user equipment UE can select a symbol index "0" from the candidate PUSCH symbol indices {0, 3, 6} as a beginning symbol index of the uplink resource UMR for multiplexing with the UCI carried by the PUCCH resource R2. Further, the user equipment UE can select another symbol index "6" as a beginning symbol index of another uplink resource UMR' from the plurality of candidate PUSCH symbol indices {0, 3, 6} for multiplexing with the PUCCH resource R2' carrying the UCI. Here, the two uplink resources R2 and R2' selected by the user equipment UE according to the plurality of candidate PUSCH symbol indices are non-overlapped. In other words, when the PUSCH is collided with multiple PUCCH resources, the PUSCH resources can be allocated or determined independently according to the multiplexing process. Further, two numbers of symbols of the PUCCH resources R2 and R2' are not limited. For example, the number of symbols of the PUCCH resource R2 and the number of symbols of the PUCCH resource R2' can be any positive integers according to the latency requirements.

Figure 18:
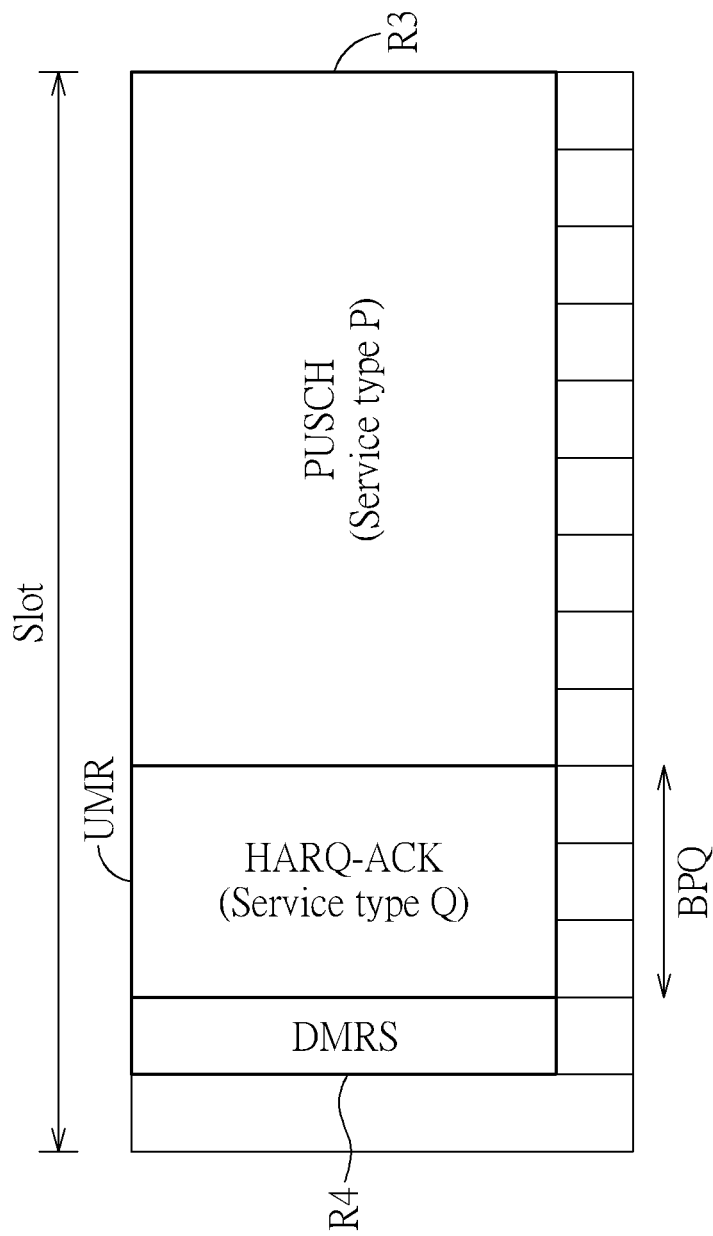
FIG. 18 is an illustration of determining a beta offset for the UCI with service type Q that multiplexed in the PUSCH with service type P.

FIG. 18 is an illustration of determining a beta offset for the UCI with service type Q that multiplexed in the PUSCH with service type P. For example, the user equipment UE can acquire the symbol of the DMRS resource R4 (say, the DMRS symbol R4). Then, the user equipment UE may set at least one candidate PUSCH symbol index according to the DMRS symbol. However, the at least one candidate PUSCH symbol index can be determined by any reasonable decision rule or technology. Then, the user equipment UE can select a symbol index as a beginning symbol index of the uplink resource UMR from the at least one candidate PUSCH symbol index for multiplexing the UCI. As previously mentioned, the user equipment UE can determine the beta offset as the requirement of the number of symbols of the uplink resource UMR according to the beginning symbol index of the uplink resource UMR. However, the beta offset can also be determined according to service combinations of the uplink resource UMR and the PUSCH resource R3. For example, the uplink resource UMR can be used for multiplexing the HARQ response information for providing a service type Q. The PUSCH resource R3 can be used for providing a service type P. The service type Q and the service type P can be identical or different. Specifically, the service combination of the service type Q and the service type P can be used for determining a beta offset equal to BPQ. Here, the service type Q can be the URLLC service, the eMBB communications service, or any reasonable NR service. The service type P can be the URLLC service, the eMBB communications service, or any reasonable NR service. The value BPQ can be a positive integer. Further, a maximum beta offset can be determined by the base station BS.

Figure 19:
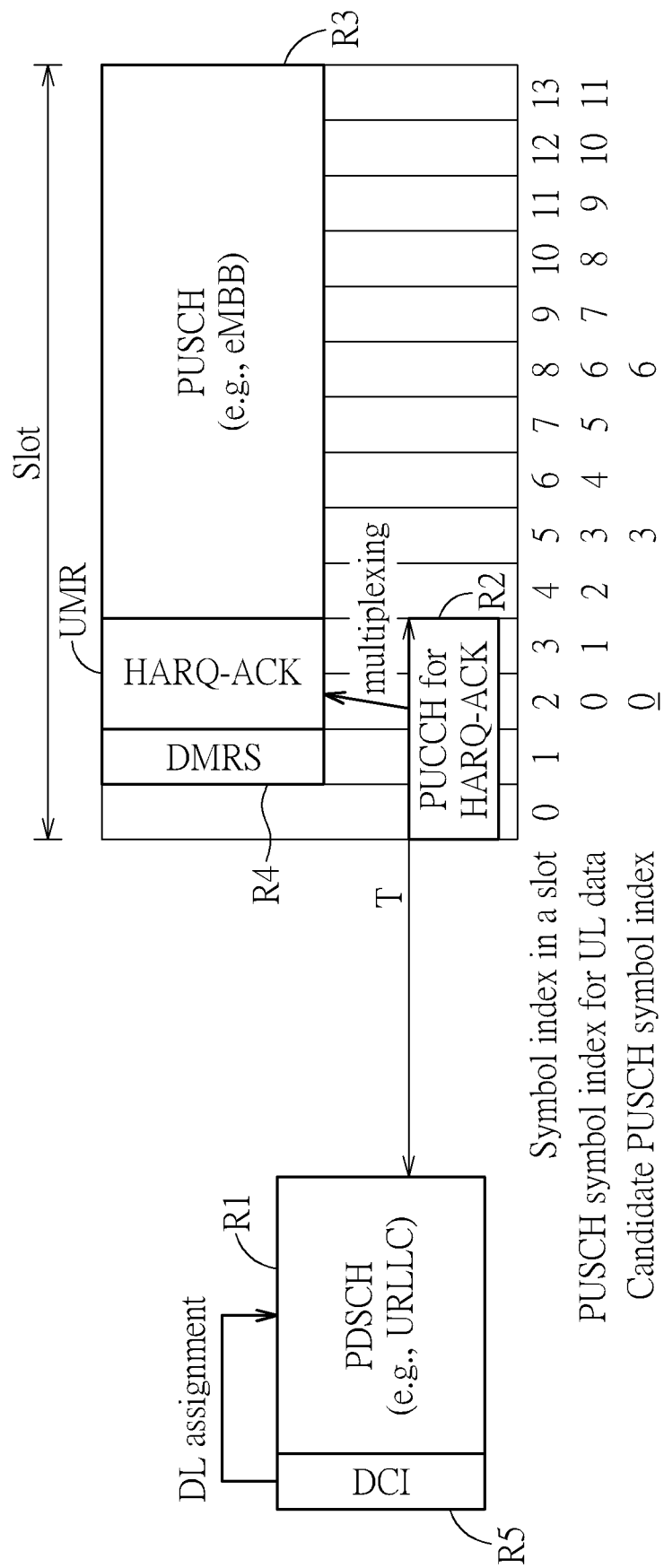
FIG. 19 is an illustration of selecting a candidate PUSCH symbol index according to a latency requirement of the PDSCH.

FIG. 19 is an illustration of selecting a candidate PUSCH symbol index "0" according to a latency requirement T. Here, the latency requirement T can be regarded as a condition of selecting the candidate PUSCH symbol index, as illustrated below. First, the user equipment UE can acquire the symbol of the DMRS resource R4 (say, the DMRS symbol R4). Then, the user equipment UE can set at least one candidate PUSCH symbol index according to the DMRS symbol R4, any reasonable decision rule, or any reasonable technology. As shown in FIG. 19, the candidate PUSCH symbol indices can be set as {0, 3, 6}. Here, a time distance between an end time of a last symbol of the PDSCH resource R1 and an end time of a last symbol of the uplink resource UMR multiplexed with the UCI in the PUSCH resource R3 is smaller than or equal to the latency requirement T of a PDSCH service. Further, the end time of the last symbol of the uplink resource UMR for multiplexing the UCI carried by the PUCCH resource R2 is earlier than or equal to an end time of a last symbol of the PUCCH resource R2. When at least one of aforementioned conditions is satisfied, the user equipment UE can select the candidate PUSCH symbol index "0" from the at least one candidate PUSCH symbol index as a beginning symbol index of the uplink resource UMR for multiplexing the UCI carried by the PUCCH resource (i.e., a beta offset for the candidate PUSCH symbol index "0" is equal to 2). Further, the total number of PUSCH symbols carrying the UCI (i.e., the uplink resource UMR) may not larger than a value, such as a symbol length of the PUCCH resource R2.

Figure 20:
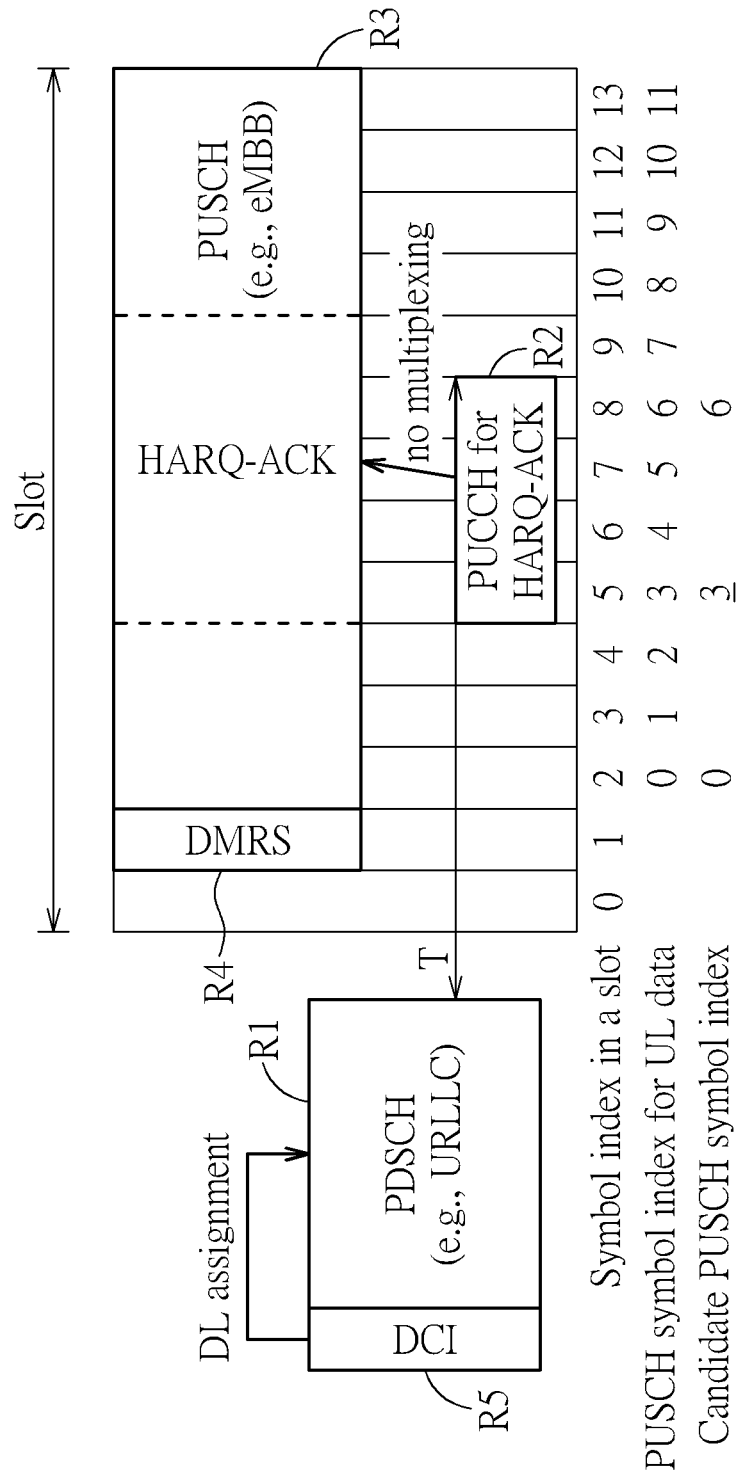
FIG. 20 is an illustration of dropping a part of PUSCH resource when a candidate PUSCH symbol index fails to satisfy the latency requirement T of the PDSCH.

FIG. 20 is an illustration of dropping a part of PUSCH resource R3 when a candidate PUSCH symbol index fails to satisfy the latency requirement T. As previously mentioned, the latency requirement T, correlations of positions between the uplink resource UMR for multiplexing the UCI and the PUCCH resource R2, and/or the offset of the PUSCH symbols can be regarded as conditions of selecting a candidate PUSCH symbol index as a beginning symbol index of the uplink resource UMR. For example, in FIG. 20, the end time of the last symbol of the uplink resource UMR having a beginning symbol index "3" (or index "6") selected from the candidate PUSCH symbol indices {0, 3, 6} for multiplexing the UCI carried by PUCCH resource R2 is "later" than the end time of last symbol of the PUCCH resource R2. Further, the start time of the candidate PUSCH symbol index "0" is earlier than the start time of the first PUCCH symbol. Thus, the candidate symbol index "0" may not be selected for determining the uplink resource for multiplexing the UCI. Therefore, no candidate PUSCH symbol index can be selected for satisfying the condition. The candidate PUSCH symbol index "3" fails to satisfy the latency requirement T. Further, the total number of multiplexed PUSCH symbols carrying the UCI (i.e., the beta offset, for example, 5 symbols from index 5 to index 9 in a slot) is "larger" than the value (i.e., PUCCH symbol length=4 symbols). Therefore, the user equipment UE can drop a part of the PUSCH resource R3, such as a PUSCH overlapped part between the PUSCH resource R3 and the PUCCH resource R2 in the time domain. The user equipment UE can also drop the PUSCH overlapped part and all subsequent PUSCH resources.

Figure 21:
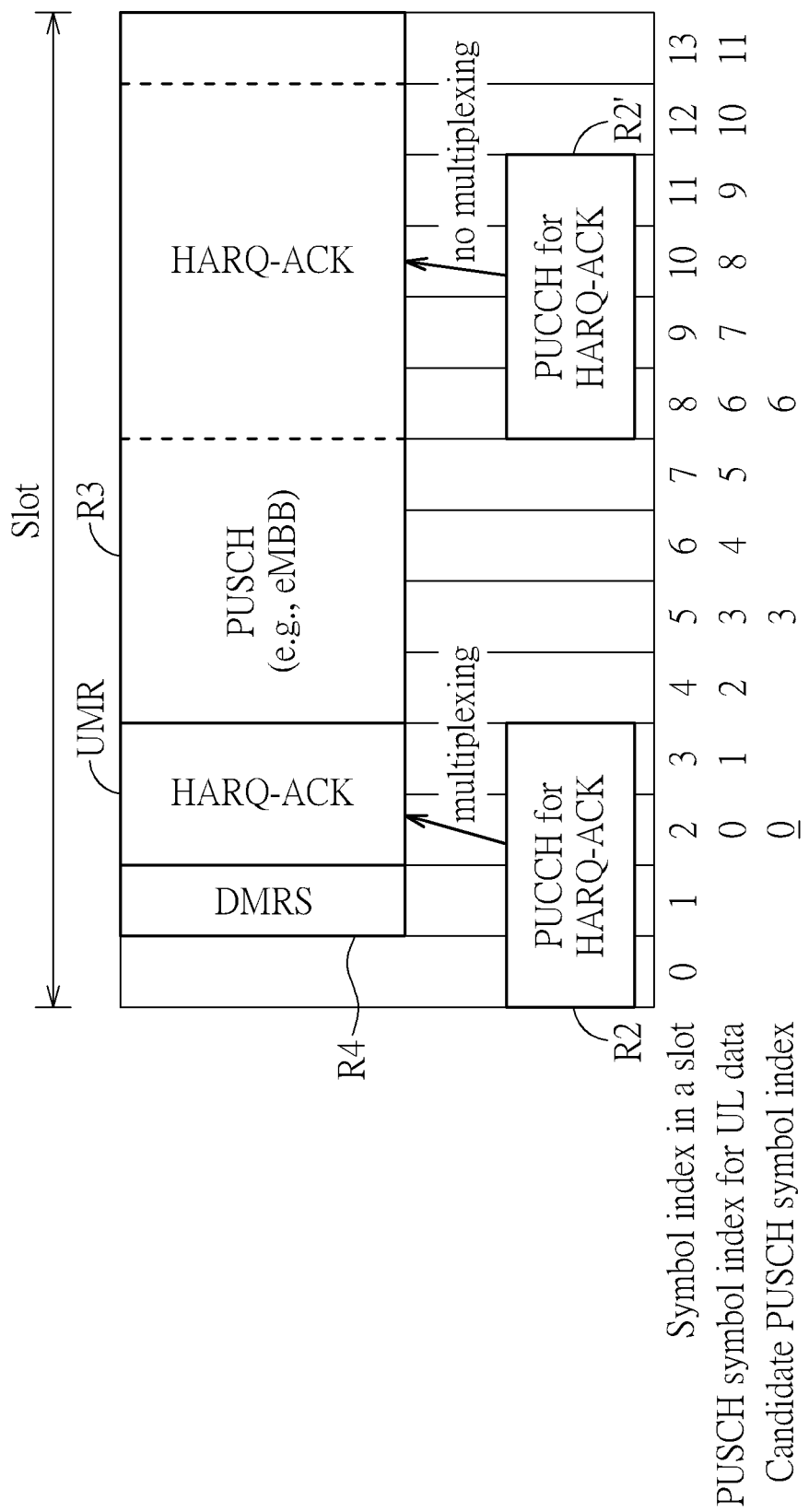
FIG. 21 is an illustration of a first mode of determining if performing multiplexing processes for the UCI on at least two PUCCH resources.

FIG. 21 is an illustration of a first mode of determining if performing multiplexing processes for the UCI on at least two PUCCH resources R2 and R2'. In FIG. 21, when two PUCCH resources R2 and R2' are introduced, the user equipment UE can determine whether to perform the multiplexing processes for the UCI carried by the PUCCH resources R2 and R2', individually. For example, in FIG. 21, the user equipment UE can acquire the PUCCH resource R2' (say, the non-multiplexed PUCCH resource R2') carrying the UCI. Then, the user equipment UE can acquire a plurality of time overlapping symbols (i.e., symbols 8~11 in the slot) of the PUSCH resource R3 according to the non-multiplexed PUCCH resource R2'. Then, the user equipment UE can drop the plurality of time overlapping symbols (i.e., dropping the symbols 8-11 in the slot) of the PUSCH resource R3 for transmitting the non-multiplexed PUCCH resource R2'. In other embodiment, after dropping the overlapping part, the remaining symbols (i.e., symbols 12-13) of the PUSCH resource R3 can also be dropped by the user equipment UE. In other words, the PUCCH resource R2 carrying the UCI can be transmitted by using the multiplexing process. However, the non-multiplexed PUCCH resource R2' can be transmitted by dropping the plurality of time overlapping symbols and optionally dropping all subsequent symbols of the PUSCH resource R3. After the non-multiplexed PUCCH resource R2 is transmitted, the user equipment UE can optionally resume a transmission of the PUSCH resource R3.

Figure 22:
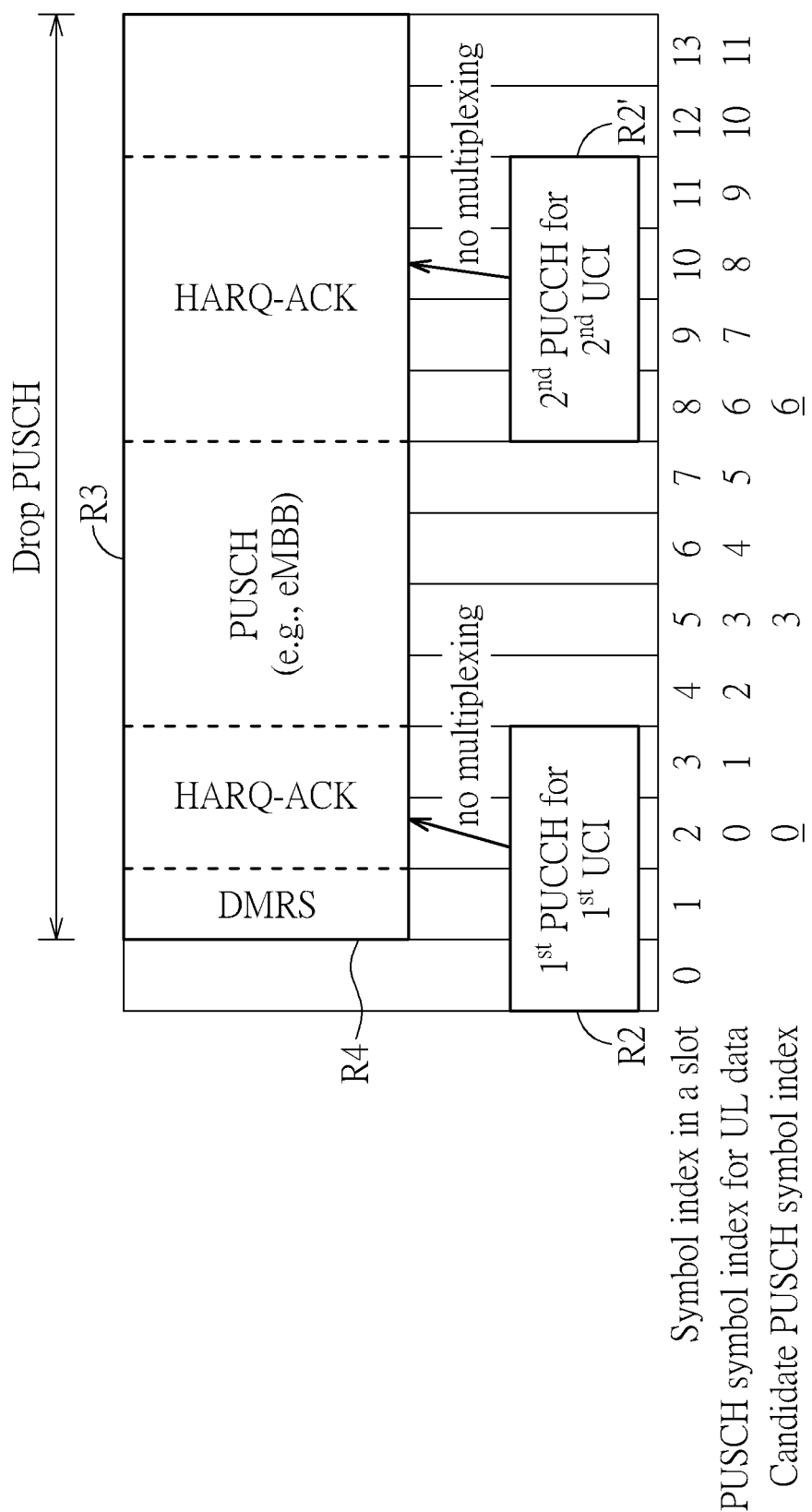
FIG. 22 is an illustration of a second mode of determining if performing the multiplexing processes for the UCI on at least two PUCCH resources.

FIG. 22 is an illustration of a second mode of determining whether to perform the multiplexing processes for the UCI on at least two PUCCH resources R2 and R2'. Here, when the UCI carried by the PUCCH resource R2 is not multiplexed with the PUSCH resource R3, the user equipment UE can cease or directly disable the multiplexing process for the PUCCH resource R2' carry another UCI. Another UCI ($2^{nd}$ UCI) can be scheduled to be transmitted later than the UCI ($1^{st}$ UCI), as illustrated below. First, the user equipment UE can acquire the PUCCH resource R2 (say, the non-multiplexed PUCCH resource R2) carrying the UCI ($1^{st}$ UCI). Then, the user equipment UE can acquire a plurality of time overlapping symbols of the PUSCH resource R3 according to the non-multiplexed PUCCH resource R2. Then, the user equipment UE can drop the plurality of time overlapping symbols of the PUSCH resource R3 in order to transmit the non-multiplexed PUCCH resource R2 carrying the UCI ($1^{st}$ UCI). Further, the user equipment UE can cease the multiplexing process of another PUCCH resource R2' (say, another non-multiplexed PUSSH resource R2') carrying another UCI ($2^{nd}$ UCI) when the plurality of time overlapping symbols of the PUSCH resource R3 is dropped for transmitting the non-multiplexed PUCCH resource R2 carrying the UCI ($1^{st}$ UCI). As a result, two multiplexing processes of the PUSCH resource R3 are disabled. In other words, the non-multiplexed PUCCH resource R2 and another non-multiplexed PUCCH resource R2' carrying different UCI can be transmitted by dropping overlapped symbols of the PUSCH resource R3 in the time domain. However, in other embodiments, all symbols of the PUSCH resource R3 in the slot can be completely dropped. In other words, when the multiplexing process of the at least one PUCCH resource is disabled, another multiplexing process of another PUCCH resource can also be disabled in the slot. Further, when at least two DMRS resources R4 are introduced in the slot, operations of all multiplexing processes can be independently determined according to the user equipment UE. Any reasonable technology modification falls into the scope of the present invention.

In the system 100, some specific decision rules for determining whether the multiplexing process of the UCI carried by PUCCH resource R2 for the second service can be performed, as illustrated below. The user equipment UE can determine the transmission priorities of the PUSCH resource R3 and the PUCCH resource R2 carrying the UCI. For example, when the PUSCH resource R3 is only used for transmitting channel state information (CSI), a priority of the PUSCH resource R3 is low. When the uplink information transmitted in the PUSCH resource R3 does not comprise a control element (CE) in the media access control (MAC) layer, the priority of the PUSCH resource R3 is low. Then, when the transmission priority of the PUCCH resource R2 carrying the UCI is greater than the transmission priority of the PUSCH resource R3, the user equipment UE can cease the multiplexing process for multiplexing the UCI carried by the PUCCH resource R2 with the uplink resource UMR selected from the PUSCH resource R2. The UCI for the second service carried by the PUCCH resource R2 can be directly transmitted from the user equipment UE to the base station BS. The at least one overlapping part of the PUSCH resource R3 can be dropped. Further, in the system 100, the user equipment UE may determine the spatial domain transmission filters for the PUSCH resource R3 and the PUCCH resource R2 carrying the UCI. Therefore, when the PUSCH resource R3 and the PUCCH resource R2 carrying the UCI are scheduled with different spatial domain transmission filters, the user equipment UE can cease the multiplexing process for multiplexing the UCI carried by the PUCCH resource R2 with the uplink resource UMR selected from the PUSCH resource R3. In the system 100, any reasonable decision rule or multiplexing method of transmitting the UCI for enhancing an efficiency of NR communications falls into the scope of the present invention.

Figure 23:
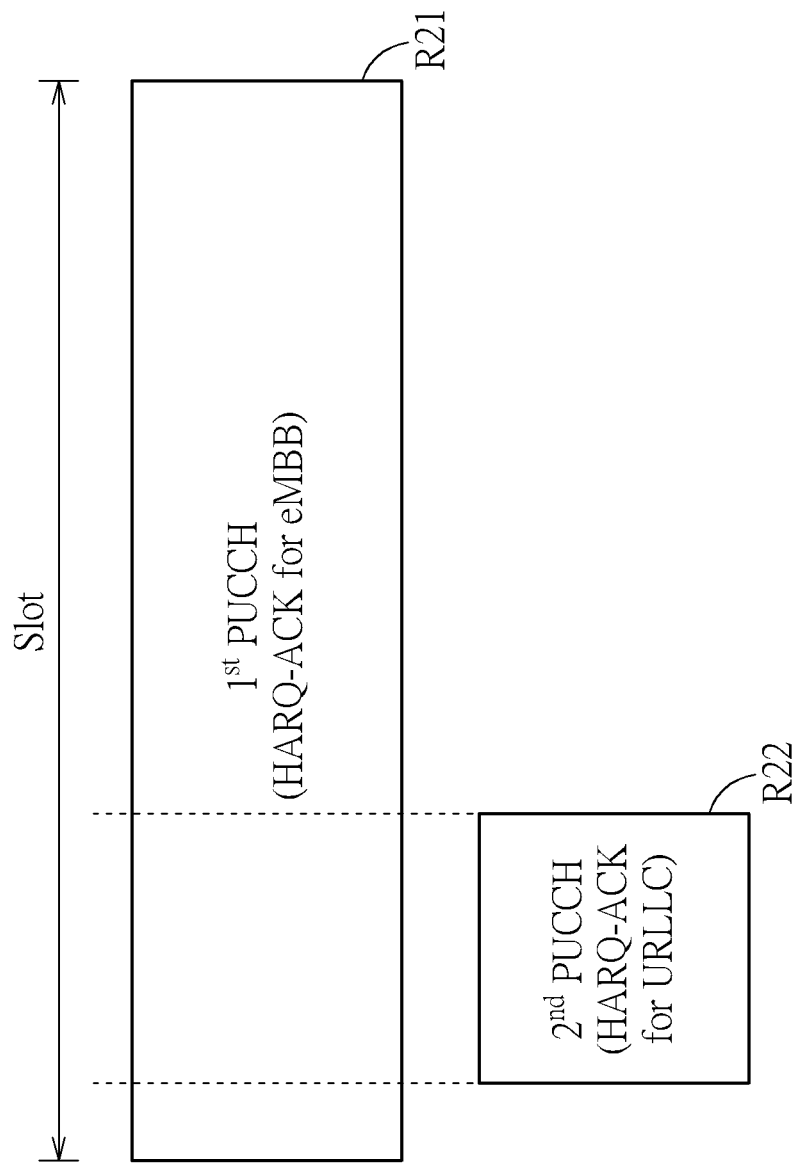
FIG. 23 is an illustration of processing at least two collided PUCCH resources for different service types of the system in FIG. 1.

FIG. 23 is an illustration of processing at least two collided PUCCH resources for different service types. For simplicity, a PUCCH resource R21 and a PUCCH resource R22 are utilized for illustrating the examples. Here, the PUCCH resource R21 carrying the HARQ response corresponding to the reception of the first service type (e.g., the eMBB communications service). The PUCCH resource R22 carrying the HARQ response corresponding to the reception of the second service type (e.g., the URLLC service). The PUCCH resource R21 and the PUCCH resource R22 are overlapped in the time domain. Some modes of processing the PUCCH resource R21 and the PUCCH resource R22 are introduced in the system 100. In a first mode, data in the PUCCH resource R21 can be compressed. For example, the user equipment UE can determine a response signal, wherein the response signal can be defined as a number of ACK (or NACK) from the HARQ response information in the PUCCH resource R21. Then, the user equipment UE can determine whether the response signals can be transmitted according to a condition (e.g., a coding rate and/or payload size). Then, the user equipment UE may drop the PUCCH resource R21 and transmit the response signal in conjunction with the HARQ response information for the second service type on the PUCCH resource R22 if the condition can be satisfied, otherwise, the UE may drop the PUCCH resource R21 and only transmit the HARQ response information for the second service type. For example, the condition may be a coding rate considering the response signal and the HARQ response information for the second service type. For another embodiment, the condition may be a limitation of payload size for the response signal and the HARQ response information for the second service type. Briefly, the PUCCH resource R21 is dropped. However, some information such as the number of ACK (or NACK) of the HARQ response in the PUCCH resource R21 can be conditionally transmitted through the PUCCH resource R22.

In a second mode, the user equipment UE can determine a response signal, wherein the response signal can be defined as the number of ACK (or NACK) from the HARQ response information in the PUCCH resource R21. Then, the user equipment UE can determine whether the response signals can be transmitted according to a condition (e.g., a coding rate and/or payload size). Then, the user equipment UE can determine whether the response signals can be transmitted according to a condition (e.g., a coding rate and/or payload size). Then, the user equipment UE can drop the PUCCH resource R21. Further, the user equipment UE can determine a configured PUCCH resource. Specifically, the configured PUCCH resource can be determined according to the PUCCH resource R21, the PUCCH resource R22, higher layer configurations, and/or physical layer indications. The configured PUCCH resource may different from the PUCCH resource R21 and the PUCCH resource R22. After the configured PUCCH resource is determined, the user equipment UE can combine information of the response signal with the HARQ response information for the second service type on the configured PUCCH. Then, the user equipment UE can transmit the configured PUCCH carrying the HARQ response information (for the second service type) in conjunction with the response signal (compressed HARQ information for the first service type) to the base station BS when the condition such as the coding rate and/or the payload size (or any reasonable rule) can be satisfied.

In a third mode, data of the PUCCH resource R21 can be bundled. Here, bundled data can be regarded as composite data generated by combining several data pieces by using "logical-AND" operators. For example, all HARQ response signals can be processed by using the "logical-AND" operators for generating the bundled data. Therefore, the bundled data can also be regarded as compressed data. Here, the user equipment UE can determine a condition of the bundled data transmitted from the PUCCH resource R21 to the PUCCH resource R22. Then, the user equipment UE can transmit the bundled data to the PUCCH resource R22 when the bundled data satisfies the condition (such as the coding rate). Then, the user equipment UE can drop the PUCCH resource R21. Finally, the bundled data of the PUCCH resource R21 can be transmitted to the base station BS through the PUCCH resource R22. For example, the user equipment UE can transmit the PUCCH resource R22 carrying the HARQ response information (for the second service type) in conjunction with the bundled data (for the first service type) to the base station BS.

In a fourth mode, the user equipment UE can determine the configured PUCCH resource. Specifically, the configured PUCCH resource can be determined according to the PUCCH resource R21, the PUCCH resource R22, higher layer configurations, and/or physical layer indications. The configured PUCCH resource may different from the PUCCH resource R21 and the PUCCH resource R22. After the configured PUCCH resource is determined, the user equipment UE can combine the bundled data with the HARQ response information for the second service type on the configured PUCCH resource. Then, the user equipment UE can transmit the configured PUCCH resource carrying the HARQ response information (for the second service type) in conjunction with the bundled data (for the first service type) to the base station BS when the condition such as the coding rate and/or the payload size (or any reasonable rule) can be satisfied.

In the aforementioned four modes, when the at least two PUCCH resources for different service types are collided in the time domain, the user equipment UE can drop one PUCCH resource. The user equipment UE can "compress" data of the dropped PUCCH resource for generating compressed data (say, the response signal), such as defined as the number of ACK (or NACK) from the HARQ response information. Then, the user equipment UE can transmit data of another PUCCH resource carrying its own UCI for the second service and the compressed data of the dropped PUCCH resource for the second service.

However, the system 100 is not limited by using the aforementioned four modes for processing the at least two collided PUCCH resources for different service types. For example, a threshold can be introduced to the system 100. When the coding rate and/or the payload size of the PUCCH resource R21 is greater than the threshold, the PUCCH resource R21 is dropped. Therefore, only the UCI of the PUCCH resource R22 for the second service type is transmitted from the user equipment UE to the base station BS. When the coding rate and/or the payload size of the PUCCH resource R21 is smaller than or equal to the threshold, the PUCCH resource R21 is also dropped. However, the UCI of the PUCCH resource R21 for the first service type can be combined with the UCI of the PUCCH resource R22 for the second service type when the coding rate and/or the payload size of the PUCCH resource R21 is smaller than or equal to the threshold (e.g., in a form of one-bit HARQ response information). There, the PUCCH resource R22 includes its own UCI for the second service type and another UCI for the first service type. Finally, the PUCCH resource R22 carrying its own UCI for the second service type and another UCI for the first service type can be transmitted from the user equipment UE to the base station BS. However, any reasonable technology combination falls into the scope of the present invention. For example, as previously mentioned, the configured PUCCH resource determined according to the PUCCH resource R21, the PUCCH resource R22, the higher layer configurations, and/or the physical layer indications can also be introduced for carrying the UCI of the PUCCH resource R22 for the second service type and another UCI for the first service type when the coding rate and/or the payload size of the PUCCH resource R21 is smaller than or equal to the threshold.

Figure 24:
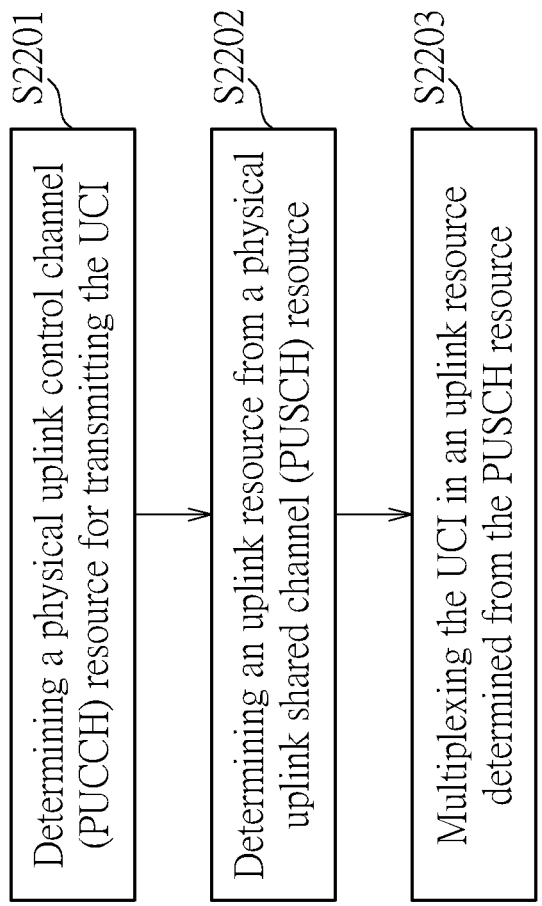
FIG. 24 is a flow chart of a multiplexing method of the UCI for the URLLC performed by the system in FIG. 1.

FIG. 24 is a flow chart of a multiplexing method of the UCI performed by the system 100. The multiplexing method of the UCI can include step S2201 to step S2203. Any technology modification of step S2201 to step S2203 falls into the scope of the present invention.

Step S2201 to step S2203 are illustrated below.
    step S2201: determining a physical uplink control channel (PUCCH) resource for transmitting the UCI;
    step S2202: determining an uplink resource from a physical uplink shared channel (PUSCH) resource;
    step S2203: multiplexing the UCI in an uplink resource determined from the PUSCH resource.

Details of step S2201 to step S2203 are previously illustrated. Thus, they are omitted here. In the system 100, when two scheduled resources for two different service types are collided in the time domain, the multiplexing process can be used for combining data of two different service types. By using the multiplexing process, the two different service types can coexist. For example, the URLLC service can coexist with the eMBB service. In other words, the system 100 can process intra-user equipment collisions of different service types, such as the URLLC service and the eMBB service. The system 100 can also process the HARQ response information for URLLC service and the HARQ response information for the eMBB service for two time overlapped PUCCH resources. Further, in the system 100, the collisions of different service types can be avoided by using the multiplexing process according to the latency requirement and PDSCH decoding capability of the URLLC, and/or according to the reliability of the HARQ response information of the URLLC. Further, in aforementioned embodiments, different service types can correspond to different priorities. For example, the eMBB communication service can correspond to a lower priority service or a first priority service. The URLLC service can correspond to higher priority service or second priority service. The priorities among different service types may be indicated by gNB and/or determined by the user equipment according to higher layer configuration and/or physical layer signal. For example, the user equipment can differentiate (e.g., the priority of) different service types via scheduling timing (e.g., time difference between uplink granted DCI and PUSCH) and/or feedback timing (e.g., time difference between PDSCH and HARQ-ACK feedback or time difference between CSI-RS and CSI feedback). For example, the shorter timing has a higher priority.

To sum up, the present invention discloses a multiplexing method and a system. A purpose of the multiplexing method is to manage different service types when communications of the different service types are collided in the time domain. Instead of dropping data of one service, data of one service can be multiplexed with a communication resource for another service. Further, the latency requirement, the processing time, the transmission priorities, the reliability, and the scheduling time correlations are also considered for adjusting operations of the multiplexing process. Therefore, collisions of the different service types can be avoided by using the multiplexing process. In summary, the system can provide co-existence of multiple service types for any NR applications, such as increasing traffic efficiency of the URLLC service and the eMBB service.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A multiplexing method of uplink control information (UCI) comprising:
    determining a first physical uplink control channel (PUCCH) resource for transmitting the UCI, wherein the UCI comprising a first set of hybrid automatic repeat request (HARQ) information;
    determining a second PUCCH resource for a second set of HARQ information;
    determining a third PUCCH resource for a third set of HARQ information in response to the first PUCCH resource and the second PUCCH resource are overlapped within a first time period, wherein the first PUCCH resource and the second PUCCH resource are corresponding to first priority and second priority respectively, wherein the third set of HARQ information comprising at least one of the first set of HARQ information and the second set of HARQ information, wherein the third PUCCH resource is determined according to a higher layer configuration and a physical layer indication;
    allocating the UCI in an uplink resource determined from a physical uplink shared channel (PUSCH) resource in response to the first PUCCH resource and the PUSCH resource are overlapped within a second time period;
    wherein the first PUCCH resource and the PUSCH resource are corresponding to the first priority and third priority respectively,
    wherein priorities of the first PUCCH resource, the second PUCCH resource and the PUSCH resource are respectively indicated by different downlink control information (DCI).

2. The multiplexing method of claim 1, wherein a first set of hybrid automatic repeat request (HARQ) acknowledgement (ACK) information is corresponding to a physical downlink shared channel (PDSCH) reception.

3. The multiplexing method of claim 1, wherein an end time of a last symbol of the uplink resource allocated with the UCI in the PUSCH resource is earlier than or equal to an end time of a last symbol of the first PUCCH resource.

4. The multiplexing method of claim 1, wherein a time distance between an end time of a last symbol of a DCI triggering an UCI report and an end time of a last symbol of the uplink resource allocated with the UCI in the PUSCH resource is not larger than a latency requirement.

5. The multiplexing method of claim 1, wherein a start time of a first symbol of the uplink resource allocated with the UCI in the PUSCH resource is later than or equal to a start time of a first symbol of the first PUCCH resource.

6. The multiplexing method of claim 5, wherein a time distance between a start time of a first symbol of the uplink resource allocated with the UCI on the PUSCH resource and the start time of the first symbol of the first PUCCH resource is minimized.

7. The multiplexing method of claim 1, wherein the third PUCCH resource corresponds to a priority that is the same as the first priority of the first PUCCH resource.

8. The multiplexing method of claim 1, wherein the UCI comprises a channel state information (CSI) report.

9. The multiplexing method of claim 1, wherein the UCI comprises scheduling request (SR) information.

10. The multiplexing method of claim 1, wherein when the uplink resource selected from the PUSCH resource is allocated with the UCI, the first PUCCH resource is dropped.

11. The multiplexing method of claim 1, further comprising:
    selecting a symbol index as a beginning symbol index of the uplink resource from at least one candidate PUSCH symbol index for allocating the UCI; and
    determining a number of the uplink resource for allocating the UCI according to the beginning symbol index of the uplink resource and a beta offset.

12. The multiplexing method of claim 11, wherein the at least one candidate PUSCH symbol index is determined according to gNB configurations or a demodulation reference signal (DMRS) symbol index of the PUSCH resource.

13. The multiplexing method of claim 1, wherein the uplink resource is determined according to a beta offset, and the beta offset is determined according to a combination of a first service type of the first priority and a second service type of the second priority.

14. The multiplexing method of claim 1, wherein determining the uplink resource from the PUSCH resource, is determining the uplink resource from the PUSCH resource according to an indicator indicated by DCI.

15. The multiplexing method of claim 1, further comprising:
    determining transmission priorities of the PUSCH resource and the first PUCCH resource carrying the UCI;
    ceasing a multiplexing process of allocating the UCI in the uplink resource selected from the PUSCH resource when a transmission priority of the first PUCCH resource carrying the UCI is greater than a transmission priority of the PUSCH resource; and
    transmitting the first PUCCH resource and dropping at least one part of the PUSCH resource.

16. The multiplexing method of claim 1, further comprising:
    determining spatial domain transmission filters of the PUSCH resource and the first PUCCH resource carrying the UCI; and
    ceasing a multiplexing process of allocating the UCI in the uplink resource selected from the PUSCH resource when the PUSCH resource and the first PUCCH resource carrying the UCI are scheduled with different spatial domain transmission filters; and
    transmitting the first PUCCH resource and dropping at least one part of the PUSCH resource.

17. The multiplexing method of claim 1, wherein the third PUCCH resource is the first PUCCH resource.

18. The multiplexing method of claim 1, wherein the second set of HARQ information on the third PUCCH resource comprises a number of HARQ responses for at least one physical downlink shared channel (PDSCH) or comprises a single bit of the HARQ responses.

* * * * *